US011422697B2

(12) United States Patent
Banks et al.

(10) Patent No.: US 11,422,697 B2
(45) Date of Patent: *Aug. 23, 2022

(54) SYSTEM AND METHOD FOR CONVERTING INPUT FROM ALTERNATE INPUT DEVICES

(71) Applicant: Bansen Labs LLC, Pittsburgh, PA (US)

(72) Inventors: John Dalton Banks, Nashville, TN (US); Noam Eisen, Monsey, NY (US)

(73) Assignee: Bansen Labs LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/036,632

(22) Filed: Sep. 29, 2020

(65) Prior Publication Data

US 2021/0034168 A1 Feb. 4, 2021

Related U.S. Application Data

(63) Continuation of application No. 16/400,287, filed on May 1, 2019, now abandoned, which is a continuation of application No. 15/089,223, filed on Apr. 1, 2016, now Pat. No. 10,318,013.

(60) Provisional application No. 62/141,620, filed on Apr. 1, 2015.

(51) Int. Cl.
| | |
|---|---|
| *G06F 3/06* | (2006.01) |
| *G06F 3/03* | (2006.01) |
| *G06F 3/038* | (2013.01) |
| *G06F 9/451* | (2018.01) |
| *G06F 3/044* | (2006.01) |
| *G06F 9/4401* | (2018.01) |
| *G06F 9/54* | (2006.01) |

(52) U.S. Cl.
CPC .............. *G06F 3/0604* (2013.01); *G06F 3/03* (2013.01); *G06F 3/038* (2013.01); *G06F 3/0441* (2019.05); *G06F 3/0655* (2013.01); *G06F 3/0679* (2013.01); *G06F 9/4411* (2013.01); *G06F 9/451* (2018.02); *G06F 9/541* (2013.01)

(58) Field of Classification Search
CPC ..... G06F 3/0604; G06F 3/0655; G06F 3/0679
See application file for complete search history.

(56) References Cited

U.S. PATENT DOCUMENTS 10,318,013 B1 * 6/2019 Banks .................. G06F 3/0604

* cited by examiner

*Primary Examiner* — Nelson M Rosario
*Assistant Examiner* — Scott D Au
(74) *Attorney, Agent, or Firm* — White and Williams LLP

(57) ABSTRACT

An apparatus for delivering alternate user input between an alternate input device and an output device, the output device configured to receive input from a conventional input device, the output device not configured to receive input from the alternate input device, the apparatus including an input interconversion processor that receives the alternate user input from the alternate input device, a processing pipeline that converts the alternate user input to a conventional user input of a type normally received by the output device from the conventional input device, and an output port that transmits the conventional user input.

20 Claims, 15 Drawing Sheets

SYSTEM AND METHOD FOR CONVERTING INPUT FROM ALTERNATE INPUT DEVICES

CROSS REFERENCE TO RELATED APPLICATIONS

This application is a continuation of U.S. patent application Ser. No. 16/400,287, filed May 1, 2019, which is a continuation of U.S. patent application Ser. No. 15/089,223, filed Apr. 1, 2016, now U.S. Pat. No. 10,318,013, which claims the benefit of U.S. Patent Application Ser. No. 62/141,620, filed Apr. 1, 2015, the contents of which are hereby included by reference in their entirety.

BACKGROUND

A wide range of electronic systems, including for example personal computers, appliances, vehicles and industrial manipulators, can be controlled by user input in some form. These systems are often "tightly coupled" to a particular set of user interface devices (e.g. mouse & keyboard, button panel, steering wheel & foot pedals, joysticks)—that is, these systems are built to be used with those specific devices or types of devices, and do not naturally offer support for other devices. In some cases the supported user interfaces may be undesirable or prohibitive for a particular user or use case, and in such cases it would be beneficial to customize users' interactions with the system. For example, someone with a physical disability affecting hand function may not be able to effectively use a standard game console controller to play a video game, whereas they may be capable of playing the video game using other controls, such as, for example, a combination of head controls and foot controls, or reconfigured existing controls, if only it were possible to control a gaming console using such inputs or in such a method.

Many electronic systems are designed to support only a small fraction of existing user interface devices and provide limited configuration options to configure the use of these devices. In many cases, it is not straightforward to reconfigure a system to use user interface devices other than those it was designed to support, and thus users are left with limited options in cases where the available user interface devices are unsuitable for various reasons. To address this problem, we have invented a modular, reconfigurable, interconverting user interface routing system. This system allows users to use electronic systems in ways adapted to their needs and preferences rather than users needing to adapt to the natural configuration of the systems, by configuring our system to use their preferred user interface devices to control a system they desire to control in a manner that suits their needs or desires.

The system enables such reconfigurable user interface compatibility, as well as a number of further enhancements such as:
- The system can process, combine, and transform input signals to create new behaviors not designed into either the user interface devices being used or the system being controlled.
- The system may provide a live-updating graphical interface, allowing users to rapidly configure and reconfigure their controls, thus reducing the barriers to optimizing their controls or switching between use cases.
- The system can log user inputs and intermediate signals, enabling analysis and reporting of system usage (applications range from safety/prevention to patient-tracking during physical therapy).
- The system enables multiple users to control the system collaboratively using multiple user interface devices (e.g., for training or assistance).
- The system can modulate user controls according to measurements or inputs (e.g., as part of a physical therapy regimen, decrease resistance as the user fatigues; as part of a training exercise, decrease assistance as user improves).

SUMMARY OF THE INVENTION

An apparatus for delivering alternate user input between an alternate input device and an output device, the output device configured to receive input from a conventional input device, the output device not configured to receive input from the alternate input device, the apparatus including an input interconversion processor that receives the alternate user input from the alternate input device, a processing pipeline that converts the alternate user input to a conventional user input of a type normally received by the output device from the conventional input device, and an output port that transmits the conventional user input.

DETAILED DESCRIPTION

Figure 1:
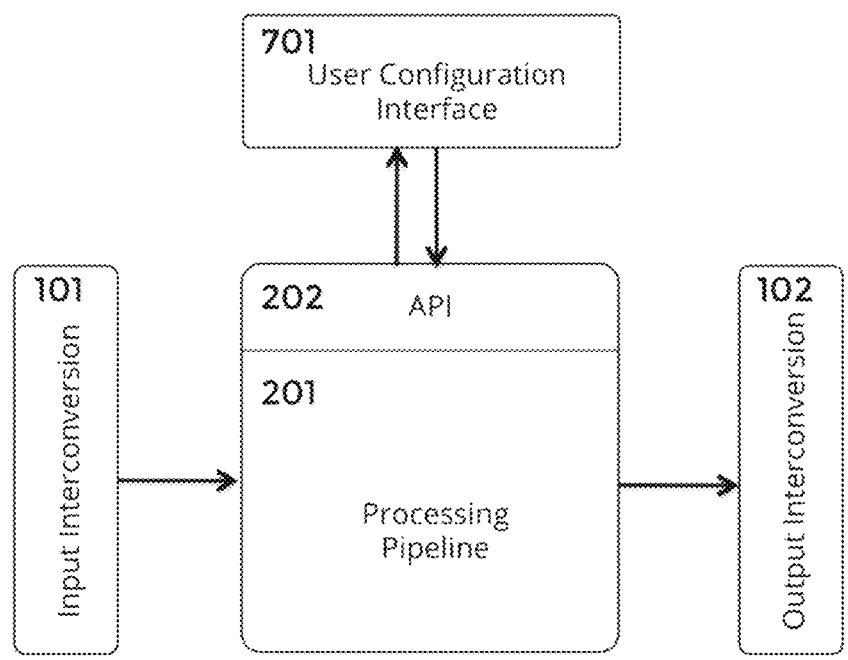
FIG. 1 shows the high-level architecture of the system.

Turning now to FIG. 1, a key innovation of the present disclosure is to insert a modular, reconfigurable signal processing pipeline 201 between user interface devices 101 and the systems desired to be controlled using them 102. The processing pipeline 201 includes an API 202.

The system accepts signals from one or more user interface devices 101, sends them through the signal processing pipeline 201, and sends the signals output by the signal processing pipeline to one or more output systems to be controlled 102. The topology of the pipeline 201 and the transformations applied are configurable or editable via an API 202.

Another key innovation of one aspect of the present disclosure is that it combines a user-friendly configuration interface 701 with the signal processing pipeline 201 between user interface devices 101 and the systems desired to be controlled using them.

By combining widely-compatible interconversion with the highly configurable signal processing pipeline and user-friendly interface, the system enables unprecedented user interface device adaptability.

Architectures

The system can be implemented in many configurations, as heterogenous or homogenous systems. It may be that each component shown in FIG. 1 is implemented as separate software and/or hardware systems, with some means of interprocess, network, or other inter-system communication; it may be that one or more components are implemented as part of the same hardware or software system; it may be that one or more components are implemented using more than one hardware or software system.

Figure 2:
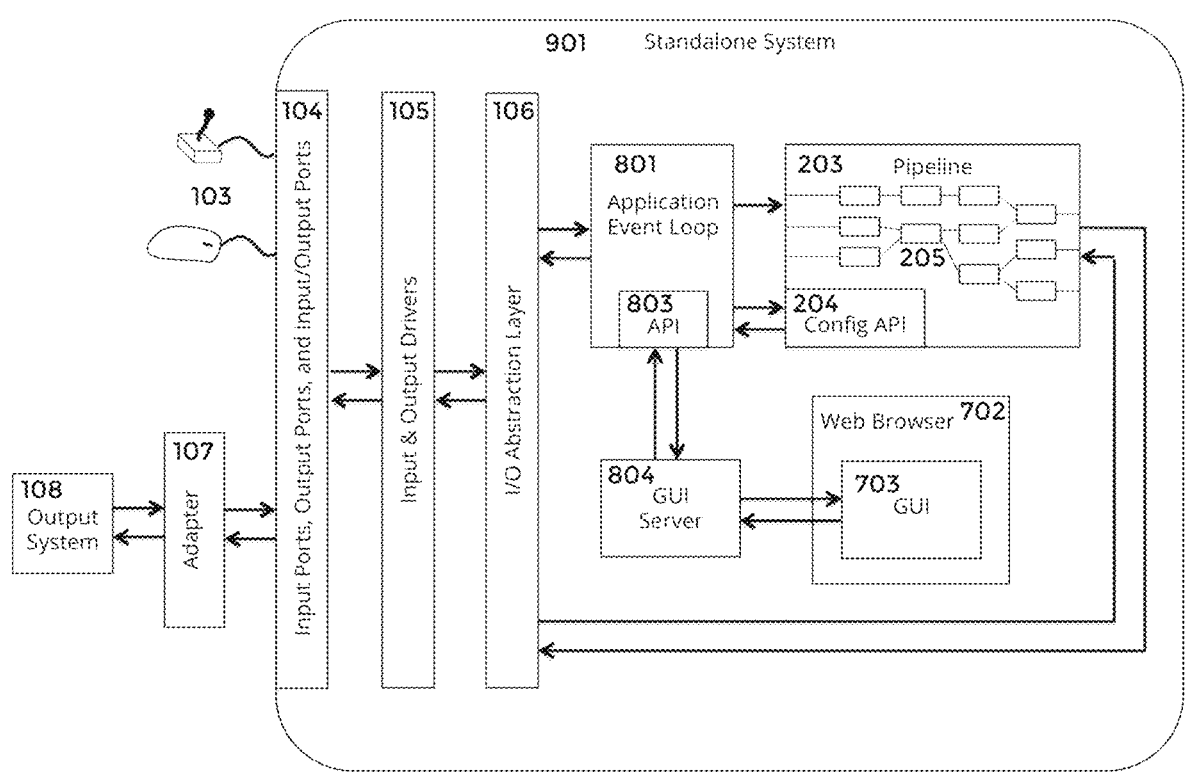
FIG. 2 shows an example architecture of a standalone implementation of the system.

In one aspect, with an example architecture shown in FIG. 2, the system may be implemented as a "standalone unit," 901 which is a single physical entity consisting of physical and/or wireless interfaces 104 for user interface devices 103 and output systems 108, and one or more processors and/or associated electronics for implementing I/O interconversion, the processing pipeline, and the API. A standalone unit may be implemented in many configurations; for instance, the interconversion and pipeline may for example be implemented using an FPGA, or may for example be implemented using a processor with dedicated electronics for device communication. In this "standalone" case, the system may for instance be used as a "plug-and-play" device used to make off-the-shelf user interface devices compatible with off-the-shelf output systems. A standalone system may include other features such as providing power to input devices, incorporating optoisolation or other means of shielding from interference from input devices, or secondary features not necessarily related to the primary function of the system, such as a media player.

Figure 3:
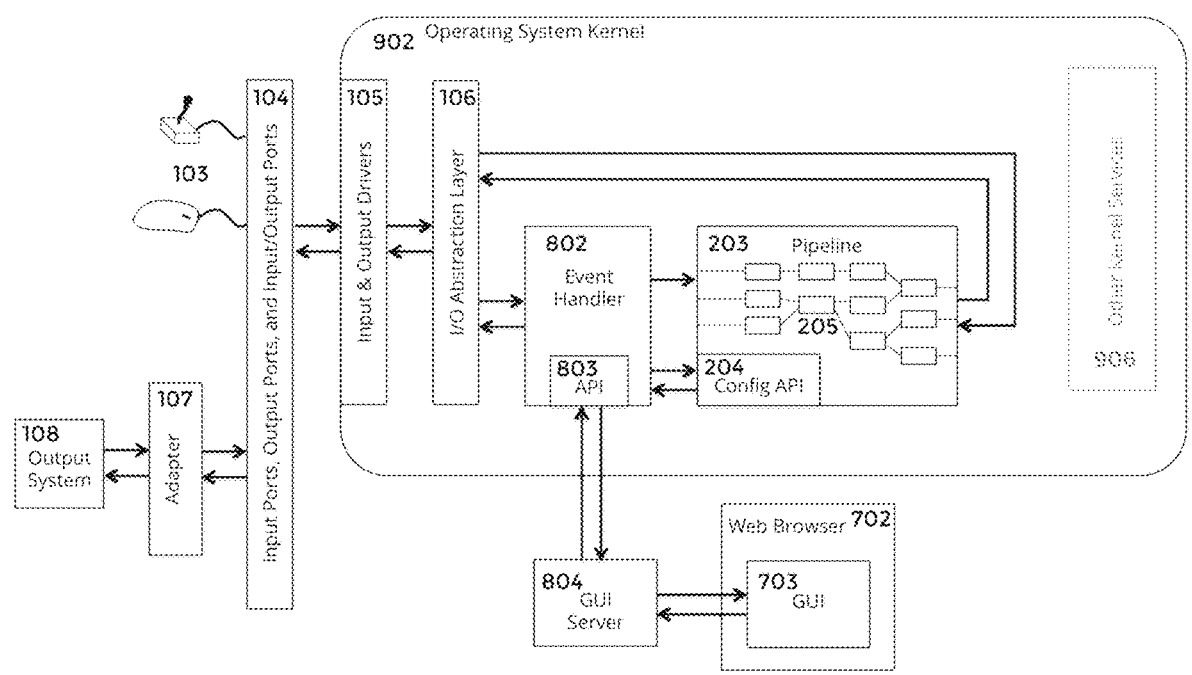
FIG. 3 shows an example architecture of an OS kernel implementation of the system.

In another aspect, with an example architecture shown in FIG. 3, the system may also be implemented as part of an operating system, for instance as part of a Linux kernel 902 providing services to the OS 906. In this case all interconversion may already be handled by the OS 105 and underlying device hardware 104, and the system would contain a "kernel space" processing pipeline 203 and would expose configuration hooks 803 to system users and applications, which could be used to configure to transform user interface device data at a kernel level before it is exposed to "user space" applications 106.

In another aspect, the system may also be implemented as part of an application such as a game, as a means of user configuration of the application. In this case all interconversion may already be handled by the OS and underlying device hardware, and the system would consist of a processing pipeline within the application that would be configurable by the application user, and used to transform user interface device data for application use without the need of kernel level configuration or the use of a standalone adapter.

Figure 4:
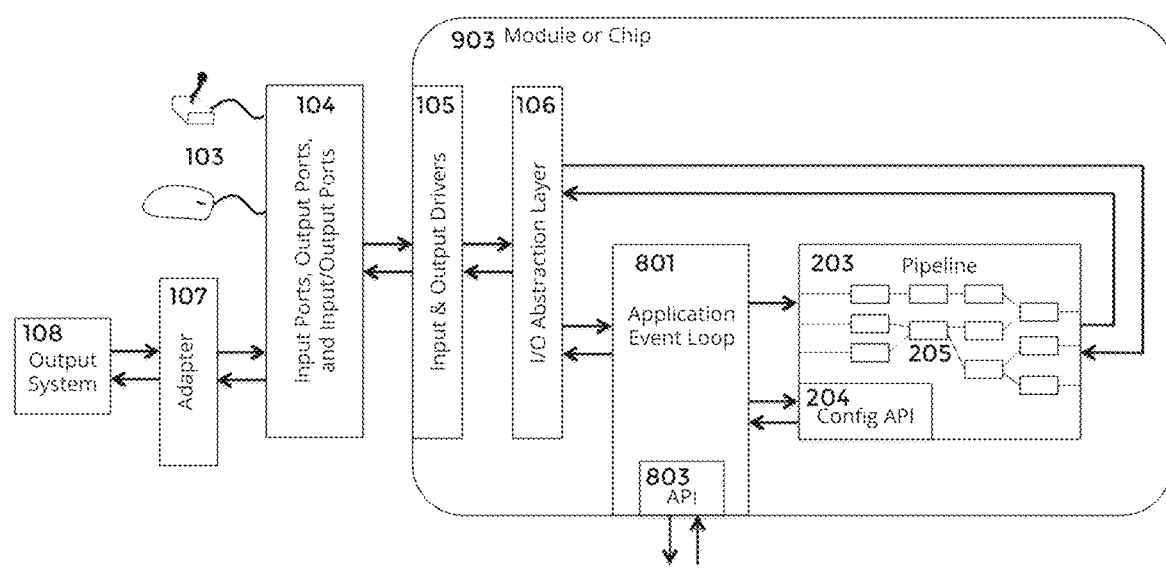
FIG. 4 shows an example architecture of a SoM/SoC implementation of the system.

In another aspect, with an example architecture shown in FIG. 4, the system may be implemented as "system on a chip" (SoC) or "system on a module" (SoM) 903. In this case the system is on a single chip (or chipset) or circuit board module 903 with physical and/or wireless interfaces 104 to user interface devices 103 and output systems 108, one or more processors and/or associated electronics for implementing I/O interconversion 105, the processing pipeline 203, and the API 803. As a SoC/SoM 903, the system may for instance be used for integration into another system (such as a power wheelchair or a cable box), for instance to make that system compatible with off-the-shelf user interface devices not designed for use with that system.

Input Devices and Output Systems

Input devices may include, for example, human interface device (HID) devices, game controllers, switches, knobs, sliders, joysticks, or other electromechanical devices, motion capture systems, voice input or voice recognition systems, wearable sensors or sensors that may be affixed to the body, robotic devices, rehabilitation equipment, electroencephalography (EEG) systems, electrocardiography (EKG) devices, electromyography (EMG) devices, or other devices or systems that generate one or more electronic signals, or that may be modified to generate one or more electronic signals (for example by adding one or more sensors).

Output devices may include, for example, computer applications, video games, virtual reality systems, virtual interactive displays, industrial manipulators, heavy machinery, automobiles, aircraft, or other systems or devices controllable in part or in whole by electronic signals.

Signal Interconversion

Input and output device data is marshalled into and out of the system via hardware or software components (physical ports, dedicated processors, device drivers, etc.) that accommodate the range of input devices and output systems supported by a particular implementation. Aspects of the system may have dedicated physical hardware for device communication (such as USB ports, bluetooth ports, switch closure ports, custom ports etc.), pre-installed electronic hardware for device communication (such as USB PHY, custom, etc.), and pre-installed device drivers (such as USB HID drivers, bluetooth HID drivers, custom drivers, etc.). The system may also support expansion of device compatibility through various methods, such as daisy-chaining via existing device ports, physical insertion of port expanders, replacement of electronic components, installation of device drivers, and reprogramming of FPGA drivers. Such expansion methods may also support hot-swapping while the system is running using various hot-swapping implementation methods readily available to those skilled in the art.

Figure 5:
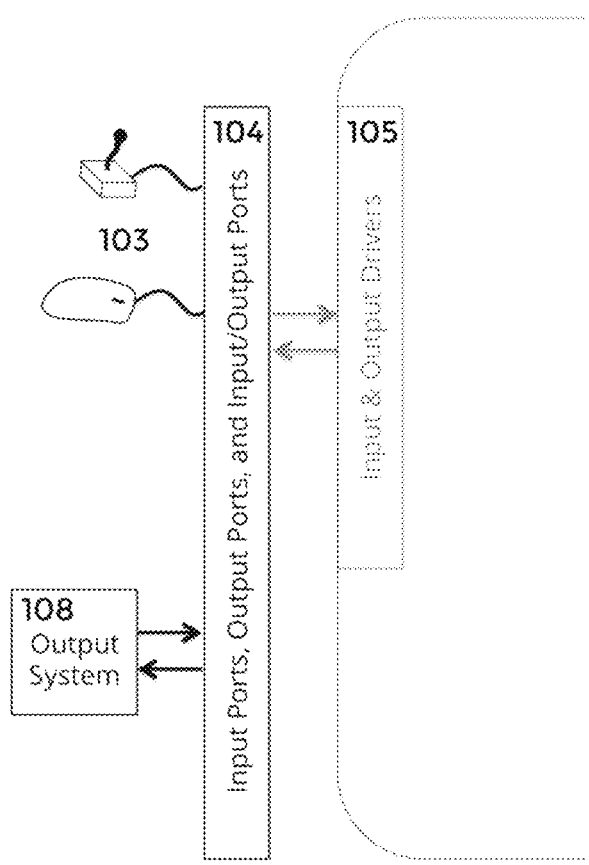
FIG. 5 shows an example of the system directly interfacing with input devices and output systems according to an aspect of the system of the present disclosure.

In various aspects different connected input devices and output devices may use different means of transmission (e.g., raw analog signals, hardwired digital protocols such as universal serial bus (USB), wireless digital protocols such as WiFi Direct) to communicate their data. As shown in FIG. 5, an aspect of the system may communicate with an input device 103 or output system 108 by natively implementing that device or system's communication protocol for a port (defined as a physical or wireless connection) 104 that may be connected directly to a port on the input device 103 or output system 108. Communications protocols, such as serial peripheral interface (SPI), universal serial bus (USB), controller area network (CAN), and other communications protocols, may be implemented using any one or any combination of a digital processor, an algorithm implementing aspects of a published or unpublished communications protocol system, purpose-designed electronic circuits and components, or other electronic means.

Figure 6:
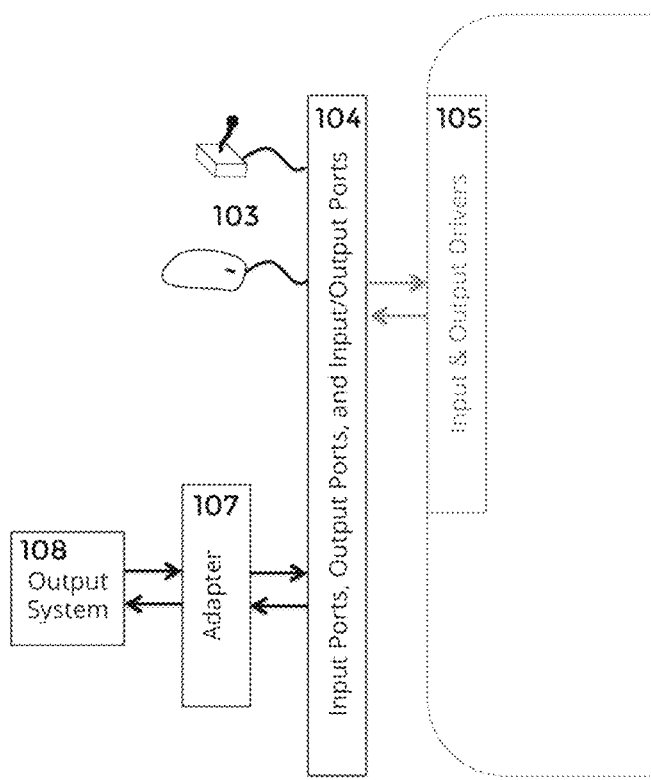
FIG. 6 shows an example of the system interfacing with input devices and output systems via an intermediary protocol converter according to an aspect of the system of the present disclosure.

As shown in FIG. 6, an aspect of the system may also communicate with an input device 103 or output system 108 via a separate protocol conversion device 107 that may connect between that input device or output system (physical connection or wireless connection) and an available port (physical connection or wireless connection) of the system 104. The protocol conversion device 107 may also be configured to interconvert the communication method of the input device 103 or output system 108 and the communication method of the connected port on the system 104. For example, consider an input device that uses a USB 2.0 protocol to communicate. An aspect of the system may for example include a USB 2.0 port to which the input device may connect via its own USB 2.0 port, and communicate using a combination of hardware designed to process USB 2.0 communication signals and one or more processing units programmed to understand and use the processed USB 2.0 communication signals.

As another example, an aspect of the system may include an SPI port to which an external SPI to USB interconverter may be connected, which may be connected also to the input device. In this arrangement, the system port may communicate using the SPI protocol while the input device communicates using the USB 2.0 protocol, and the SPI to USB interconverter allows communication emitted by the system as SPI signals to be received by the input device as USB 2.0 signals, and communication emitted as USB 2.0 signals to be received as SPI signals. In this manner, input device ports may communicate with system ports, provided that either the system can connect to the input device port and implement its communication protocol, or that an interconverter is used that can facilitate connection of the system port and the input device port and communications between them. This approach applies both to currently available protocols and protocol interconverters, to protocols for which no interconverters currently exist (but which may be developed), and to protocols and protocol interconverters that may be developed.

An aspect of the system also may include one or more expansion ports and analog and digital input boards. Expansion ports may accommodate more devices than there are physical ports for on the system. Analog input boards may have any number of input channels, each directly measuring transmitted voltages, currents, or other signals from any connected electronics. Digital input boards may have any number of input channels, each directly measuring transmitted boolean signals from any connected electronics.

Signal Processing Pipeline

Routing and Transformations

The purpose of the signal processing pipeline is to allow the system to route and transform signals received and interconverted from one or more input devices singly or in various combinations to produce signals useful for interconversion and output to control output systems, for measuring characteristics of a user's interaction with the input devices, for evaluating characteristics of a user's ability, and for other uses by and within the system. Any component of the system having one or more processing units, such as the main signal processing pipeline or an auxiliary processing device, may transform the signals via one or more transformations, functions, and methods described herein, or other transformations, functions, or methods which may be useful, to one or more intermediate signals before transformation to a signal used to send output to an output system. The system may route signals from one or more particular input devices, via transformations, multiplexing, or various intermediate forms, to one or more particular output devices, according to the configuration of the system by a user or other means.

Input devices may be represented as one or more analog or digital "channels," with each channel corresponding to one or more degrees of freedom, manipulable states, or other aspects of an input device which a user may affect, and one or more associated signals. The system may buffer, store, multiplex, or convert signals between and amongst various representations and formats. The system may represent signal values digitally, in analog, or in other electronic formats useful in representing real numbers, boolean numbers, discrete numbers, and other values. To accomplish this mapping from input signals to output signals, the system or a connected computing device may include one or more processing units, and executable code that is configured to cause the processor to implement all or part of this functionality.

For example, consider a user interface device comprising two separate lever-like user interfaces, and that is configured to produce signals corresponding to a user's manipulation of the interfaces. The signals may each be represented as a channel, and the system may transform the signals to a normalized representation (see transformations described herein) and then send them via multiplexing to the horizontal and vertical axes of the right joystick included in a game system controller that may be attached to the output, such that output signals are sent to the controller or output system that emulate the native signals of the controller.

Architecture

Figure 7:
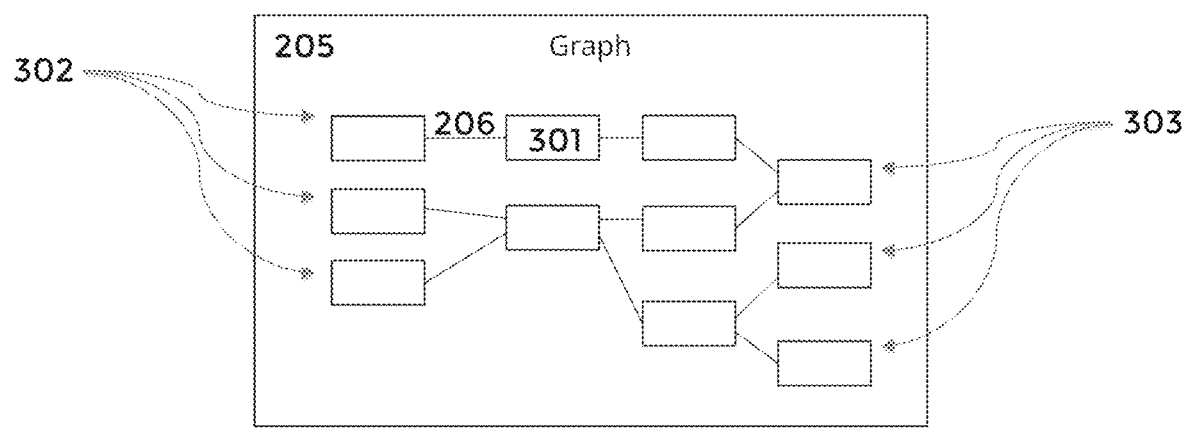
FIG. 7 shows a graph-based architecture of the signal processing pipeline according to an aspect of the system of the present disclosure.

In one aspect, as shown in FIG. 7, the signal processing pipeline may be implemented as a data flow graph with executable nodes. "Graph" 205 means a set of "nodes" 301 and connections (or "edges" 206) between nodes. "Dataflow graph" means that certain nodes may be executed in response to data being available at their input ports. "Executable nodes" are connection points in a graph that have code that executes when data is available at their input ports, and may send data (for example to other connected nodes) via their output ports. Nodes may execute within the same process or may execute in separate process on one or more computing systems. Data can likewise pass from output ports to input ports via direct function calls in the same process, interprocess communication (IPC), networked communication such as TCP or other means of communication. Data enters the pipeline via "source nodes" 302 that have one or more inputs accessible by one or more sources outside of the graph and exits via "sink nodes" 303 that have one or more outputs available to one or more recipients outside of the graph.

This aspect advantageously allows the user a great deal of flexibility, customizability and clarity in routing and transforming input signals for control of output systems. In other aspects, the signal processing pipeline may be implemented using other architectures than a data flow graph with executable nodes, such as a series of purely linear (non-branching) processing sequences originating from single input channels and terminating at single output channels. The pipeline may use different architectures to achieve all the same benefits of a data flow processing network, or may instead use different architectures to offer a reduced or different feature set (potentially to reduce cost or simplify the user experience). For example, a limited implementation of the pipeline may only offer the option of routing input channels to output channels, and only apply signal transformations as specified by system defaults and device profiles.

Example Transformations

Affine Scaling

The system may construct signals of a given range or magnitude based on input signals of different range or magnitude via affine scaling. The system may scale an input signal by first mathematically adding to its value a first real number to yield an offset signal, and then mathematically multiplying the offset signal with a second real number to yield a scaled signal. The system may permit a user to select either or both of the first real number and the second real number. The mathematical operations may be executed by one or more of the system's processing units. The system may use the value of the scaled signal in constructing an output signal, or the system may store, further process, or otherwise use the scaled signal.

For example, consider a user interacting with an input device such that the user normally achieves 60 degrees of angular range of motion (i.e. the angular displacement from the extreme of flexion, adduction, or other direction of motion, to the extreme of extension, abduction, or other opposing direction of motion), and such that that user's angular range of motion is centered at a 45 degree measured angle on the input device. For this example user, scaling may be used to construct an output signal ranging from zero to one (for example to be used as a normalized output signal) using a first real number of negative 45 and a second real number of 60, such that by first adding negative 45 to the input signal and next multiplying the resulting shifted signal by $\frac{1}{60}$, the resulting scaled signal will lie in the range from 0 to 1, inclusive.

Thresholdinq

The system may use thresholding to construct signals taking only finite discrete values based on continuous-valued or discrete-valued input signals. The system may threshold an input signal by comparing its value against one or more real numbers and constructing a thresholded signal taking one of a finite set of values according to the results of the comparisons. The system may perform comparison operations sequentially low-to-high, high-to-low, or in another suitable order, or concurrently, and may execute comparison operations using one or more processing units or other electronic means. The system may use the value of the thresholded signal in constructing an output signal, or the system may store, further process, or otherwise use the signal.

For example, consider a user interacting with an input device yielding at least one continuous-valued signal such that minimum exertion by the user yields a signal value of zero and maximum exertion by the user yields a signal value of 100. Assume this user will control a button via this user's exertion, such that only three-quarters exertion or more triggers the button. The system may construct a thresholded signal such that its value is one (logical true) when the input signal is greater than 75, and zero (logical false) otherwise. The system may use this thresholded signal to construct an output signal emulating the output of a standard switch.

In the aspect described above, thresholding could for example be implemented as a Transformation node with a "val" input, a "threshold" input, and a "val" output, which outputs a value of "1" on the "val" output if the "val" input exceeds the "threshold" input, and a value of "0" on the "val" output otherwise.

Hysteresis

The system may introduce hysteresis during signal thresholding for purposes such as curtailing oscillations of the resulting signal, shaping certain user experience characteristics, and other purposes. The system may implement hysteresis using one or more processing units by varying the real values used in comparison according to a previous value of the signal being thresholded and a present value of the signal being thresholded, such that the real value is increased when the present value of the signal being thresholded is greater than the previous value of the signal being thresholded, or such that the real value is decreased when the present value of the signal being thresholded is less than the previous value of the signal being thresholded. For instance, if the previous value is less than the original real value for comparison and the present value is greater than the original value for comparison, the system may compare the signal being thresholded against a value equal to the original value for comparison plus 10; whereas if the previous value is greater than the original real value for comparison and the present value is less than the original value for comparison, the system may compare the signal being thresholded against a value equal to the original value. Alternately, if the previous value is less than the original real value for comparison and the present value is greater than the original value for comparison, the system may compare the signal being thresholded against a value equal to the original value for comparison multiplied by 1.05; whereas if the previous value is greater than the original real value for comparison and the present value is less than the original value for comparison, the system may compare the signal being thresholded against a value equal to the original value minus 1. The system may use any combination of addition and multiplication and other mathematical functions to modify the real values for comparison. The system may alternatively implement hysteresis using one or more processing units or by digital or analog circuitry or other electronic means.

Logical Functions

The system may use logical functions to create discrete-valued signals based on discrete-valued signals. The system may use boolean logic operations to construct boolean signals based on boolean signals. The system may use higher-order logic functions to construct signals taking one or more values from signals taking two or more values. The system may execute logical operations using one or more of: electronic logic gates, one or more processing units, or other digital electronic components. For example, consider two buttons each producing a boolean signal taking the values 1 (logical true) when the button is pressed, and 0 (logical false) otherwise. The system may construct a boolean signal taking the values 1 (logical true) when both buttons are pressed, and 0 (logical false) otherwise, by combining the two buttons' signals using the logical AND operation, executed by one or more processing units running executable code. As a separate example, consider two lever-like input devices each producing a discrete-valued signal, L1 for the first lever, and L2 for the second lever, taking the value 0 when pushed near to the far extreme of its range of motion, taking the value 2 when pushed near to the other extreme of its range of motion, and taking the value 1 otherwise. To measure the manual coordination of a user manipulating these levers, the system may logically combine signals L1 and L2 to create a resulting discrete-valued signal taking the value 0 when both levers are pushed near to the far extremes of their respective ranges of motion, 2 when both levers are pushed near to the other extremes of their respective ranges of motion, 1 when neither lever is pushed near an extreme of its respective range of motion, and 3 when each lever is in a different state from the other, by executing on one or more processing units running executable code the following logical function: 0 if L1==0 and L2==2; 1 if L1==1 and L2==1; 2 if L1==2 and L2==2; 3 by default.

Arbitrary Functions

The system may construct signals based on other signals via functions that map one or more values to one or more values parametrically, discretely, piecewise, dynamically, linearly, nonlinearly, identically, exponentially, trigonometrically, or via other functions that may be implemented or specified via software or hardware, individually or in combination. The system may permit such functions may be defined via one or more of: standard or non-standard mathematical functions, one or more tabulations, set notation, piecewise construction, memoryless or dynamic transfer functions, or other means for defining functions and mappings, such that a resulting signal may be constructed based on a signal. For each value of a first signal, the system may generate a corresponding value of a resulting signal using one or more of: one or more digital processing units, digital or analog circuitry, or other electronic means. The system may use executable code in conjunction with one or more processing units to effect part or all of the generation of values of the resulting signal, and may make use of one or more lookup tables, standard or non-standard implementations of mathematical functions, if-else or switch-case constructs, or other coding techniques useful in signal processing. This may enable mapping functions to be designed that compensate for certain physical characteristics of a user, to compensate for characteristics of an input device, to affect certain user experience characteristics, or for other purposes. For example, consider a user with muscle spasticity or tremors interacting with a lever-like input device that produces an input signal corresponding to the angular displacement of the lever, with a signal value of 0 corresponding to one extreme of angular displacement and 10 corresponding to the other extreme of angular displacement. The system may filter the input signal using a 1st-order low-pass dynamic filter, represented as a transfer function in the Laplace Domain and implemented digitally in the Z-Domain after conversion via Z-transform, to construct a signal wherein high-frequency user inputs are attenuated.

Composition of Functions

The system may permit signal manipulation functions such as scaling, thresholding, linear combination, and others described in this document to be composed such that the one or more signals resulting from application of a first function are used as input signals in the application of a second function, and so on with two or more functions, resulting in a final resulting signal. The system may permit one or more functions to be composed symbolically to produce a composite function, and the system may permit a composite function to be applied to a signal to construct a resulting signal. Composition may be implemented algorithmically in code, or by arrangement of one or more processing units, or by arrangement of other electronic components or devices. For example, the system may process signals from a joystick producing separate signals corresponding to horizontal displacements and vertical displacements, with values x and y, respectively, being used as an input device, using executable code and one or more processing units, to emulate six separate buttons as follows: first the system may normalize the x and y signals in the cartesian space by subtracting from each its center value and dividing each by its magnitude, yielding the cartesian space values X and Y, respectively; next the system may convert X and Y to values in a polar space by setting radius $r=\mathrm{sqrt}(X^2+Y^2)$, and angle theta=atan 2(X, Y); next, the system may threshold r using a comparison value of 0.75, to create a signal R={1 if r>0.75; 0 else}, and the system may threshold theta in increments of 60 degrees beginning at zero, to create a signal Z={0 if 0≤theta<60; 1 if 60≤theta<2*60; . . . ; 4 if 4*60≤theta<5*60; 5 else}; next the system may construct six separate signals Q[i] such that Q[i]={1 if Z=i and R=1; 0 else}, each of which may be used to emulate a single switch.

Linear Combination of Signals

The system may permit signals to be combined via linear combination to produce resulting signals based on the combined signals. To combine a set of first signals via linear combination, a the system may calculate a resulting signal as follows: the system enables one real number to be selected per first signal, the value of each real number selected independently from the others; the system may multiply the value of each first signal by one such real number to produce a set of intermediate signals; the system may set the value of the resulting signal equal to the sum of the values of the intermediate signals (i.e. the value of the first intermediate signal plus the value of the second intermediate signal, etc., plus the value of the last intermediate signal), plus the value of another independently selected real number. The system may execute linear combination using one or more of the following: digital circuitry, analog circuitry, one or more processing units, executable code, or other electronic means.

Polynomial Combination of Signals

The system may combine a set of first signals via polynomial combination to produce resulting signals based on the combined first signals. To combine a set of first signals via polynomial combination, the system may construct a resulting signal as follows: the system may multiply each first signal with unity or with one or more first signals (including itself) one or more times to produce a set of first intermediate signals; the system may permit one real number to be selected per first intermediate signal, the value of each real number selected independently from the others; the system may multiply the value of each first intermediate signal by one such real number to produce a set of second intermediate signals; the system may set the value of the resulting signal equal to the sum of the values of the second intermediate signals (i.e. the value of the first of the second intermediate signals plus the value of the second of the second intermediate signals, etc., plus the value of the last of the second intermediate signals), plus the value of another independently selected real number. For example, consider a lever-like input device producing a continuous signal varying in response to user manipulation to yield a signal of value zero when the user does not exert and of value 100 when the user exerts maximum effort, and an input device measuring quality of posture of a user and producing a continuous signal corresponding to its measurement, this signal's value lying between zero and one, both input devices connected to the system. The posture measuring input device may be made to inhibit the user's effectiveness with the lever-like input device when the user's posture is poor by instructing the system to construct a signal equal to the signal of the lever-like input device when the user's posture is best, decreasing in magnitude as the user's posture becomes worse, and equal to zero when the user's posture is worst. The system may permit this to be done by allowing for the system to be instructed to construct a resulting signal via polynomial combination, such that the resulting signal is equal to the product of the lever-like input device signal and the posture measuring input device signal. The system may implement polynomial combination of signals using one or more processing units running executable code or by one or more processing units or by other electronic means.

Mixed Combination of Signals

The system may combine signals via mixed combination to produce resulting signals based on the combined signals. To combine a set of first signals via mixed combination, the system may construct a resulting signal as follows: the system may set a resulting signal equal to one first signal when the value of a controlling first signal is above a set threshold, and the system may set the resulting signal equal to another first signal when the value of the controlling first signal is below the threshold. The system may repeat, cascade, or otherwise compose such operations to yield more complex behaviors such as multiplexing between multiple first signals according to the value of one or more first signals. The system may execute mixed combination of signals using one or more processing units or by other electronic means. The system may use executable code to implement mixed combination in a flexible or predefined manner. For example, consider three button input devices each producing a boolean signal B[i], each button with an associated lever input device producing a signal S[i] corresponding to deflection of the lever, all connected to the system. The system may construct a resulting signal via mixed combination that takes the value of the signal of each lever's signal when that lever's associated button is pressed, and value zero otherwise, by executing code on a processor unit implementing the following function: S1 if B1==1; S2 if B2==1; S3 if B3==1; 0 otherwise.

Signal Limiting

The system may construct signals limited in one or more of their extreme values based on signals via signal limiting. The system may use signal limiting to limit one or more of the maximum or minimum values of the resulting signal. The system may accomplish signal limiting by comparing the value of a first signal against a real value, and constructing a resulting signal equal to the first signal if the first signal is either less the real value in the case of maximum limiting, or greater than a real value in the case of minimum limiting, and equal to the real value otherwise. The system may compose signal limiting operations to limit one or more extremes of a signal's values. The system may execute limiting of signals using one or more processing units or by other electronic means. The system may use executable code to implement signal limiting in a flexible or predefined manner. For example, consider one axis of a joystick input device presenting a signal ranging in value from 0 to 100, but being used in the central 25 degree angular arc of its motion via affine scaling such that an intermediate signal S1 might range in value from −200 to +200 upon full deflections of the joystick. In order to present an output signal S0 ranging from −50 to +50 upon deflection of the joystick to the limits of its 25 degree range, the system may use signal limiting by executing on one or more processing units executable code implementing the following logic: S0=S1; if S1>50, S0=50; if S1<−50, S0=−50.

Input-Triggered Macros

The system may generate, trigger, or queue macro signals embodying predefined sequences of values upon detection of particular values or sequences of values of one or more input signals. Macro signals may embody constant, linear, polynomial, exponential, logarithmic, trigonometric, discrete, smooth, piecewise, or other time series of values that may be useful in controlling output devices or for other uses by or within the system. The system may generate macro signals using one or more processing units or by other electronic means, which may be complemented by the system's use of one or more of: algorithms implemented in executable code, one or more lookup tables, one or more memory units, or other means for generating predefined sequences of values. The system may use macro signals to enact sequences of high-order events in an attached output system (e.g. setting up or starting a video game on a computer or game console). For example, the system may permit a button input device to be used to trigger the setup of a game on a game console output device by triggering upon the push of the button (a logical true signals) one or more macro signals that emulate game controller interactions such as the press of an 'A' button, the leftward movement and return to neutral of a joystick horizontal axis, the push of a 'start' button, and the pull of a right trigger, of appropriate durations and sequence to direct the output device to set up and start the game.

System Configuration and UI

API and Configurability

The purpose of the system is to flexibly support a wide range of user needs, and toward this end the system exposes configuration options that allow users to modify its pipeline as desired for various combinations of input devices, output devices, and signal transformations to support a variety of use cases. These configuration capabilities are described generically as an "application programming interface" (API), a set of instructions a user (whether a person or another system) can generate (possibly via a graphical interface) and send to the system via some means of communication (such as TCP packets over a network), that will correspondingly modify or query the system in various ways and send back relevant information as appropriate. The API may also "push" information to the user in response to an external data event or internal timer, without waiting for a user request. The API may also allow the user to configure the push notifications they would like to receive.

The essential user configuration capability is to modify of the pipeline graph as appropriate to various uses and users. Pipeline modification instructions 204 may be on the level of addition, removal, and querying of executable nodes and connections between nodes, and may be higher order combinations of such operations for user convenience or clarity. Beyond pipeline configuration, other system configuration options may be provided, such as, for example, network settings and logging frequency.

The system API may support a variety of methods of user configuration, such as graphical user interfaces, command line interfaces, scripts, or other applications or systems. Any interface that can produce or receive API commands recognized by the system may be used as a means of configuring the system.

Function Specification (Native Editor, Downloadable Plugins, Exposable API)

The system may permit signal mappings and signal transformation functions such as those described in this document or others to be specified, loaded, tuned, defined, edited, or otherwise configured using an interface that the system may provide, downloaded to the system from a separate source, or otherwise defined using the system or transferred to the system. The system may permit mappings and functions to be stored in one or more volatile or nonvolatile memory units or to be represented in mathematical notation, executable code, algorithm, one or more markup languages, or other method of storing mappings or functions. The system may permit mappings and functions to be created by recombining or editing previously defined mappings or functions. The system may permit mappings and functions to be specified by inputting or transferring mathematical, logical, or other formulas graphically, by command line, or by other means of interface. The system may permit mapping and functions to be specified by inputting or transferring one or more lookup tables in tabular form, as a markup document, or other format for specifying lookup tables. The system may permit functions to be specified by creating or transferring parametric or discrete-valued input-output curves, such as linear, polynomial, bezier, spline, and other types of curve. The system may supply a graphical user interface that may be used in constructing such curves. The system may use linear or nonlinear interpolation methods to interpolate between specified points in the definition of a function. The system may permit mappings and functions to be specified such that one or more of their defining values may be chosen or altered by a user, by the system, or by other command, such that the mapping or function may be executed to reflect the defining values. The system may supply one or more linear sliders, rotational knobs, or other variable interface component, or virtual graphical depictions thereof, that may be used in adjusting the defining values. The system may expose one or more application programming interfaces that may enable the use of various specifications, implementations, and representations of mappings or functions, parts of mappings or functions, or mathematical or other operations. The system may embody mapping or function specification or tuning modes enabling interactive definition of mappings, functions or defining values. The system may measure characteristics of input device signals received during specification or tuning to select defining values, such as measuring a user's range of motion, strength, speed, dexterity, or other characteristics to select defining values for scaling, thresholding, or other functions that may influence the user's experience. The system may enable specification, loading, tuning, defining, editing, and other configuration functionalities using one or more processing units or by other electronic means, which may be complemented by the use of one or more of: algorithms implemented in executable code, one or more graphical displays, one or more graphics specifications or predefined graphical views, one or more memory units, or other means for enabling the functionalities, which may be part of the system. The system may use one or more wired or wireless connections to enable these functionalities to be executed remotely.

The system may permit macro signals such as those described in this document or others to be specified, loaded, tuned, defined, edited, or otherwise configured using an interface that may be provided by the system, downloaded to the system from a separate source, or otherwise defined using the system or transferred to the system. The system may store macro signals in one or more volatile or nonvolatile memory units, and may permit their representation in mathematical notation, executable code, algorithm, one or more markup languages, or other method of storing macro signals. The system may permit macro signals to be created by recombining or editing previously defined macro signals. The system may permit macro signals to be specified by inputting or transferring mathematical, logical, or other formulas or time series graphically, by command line, or by other means of interface. The system may permit macro signals to be specified by inputting or transferring one or more lookup tables in tabular form, as a markup document, or other format for specifying lookup tables. The system may permit macro signals to be specified by creating or transferring parametric or discrete-valued input-output curves, such as linear, polynomial, bezier, spline, and other types of curve. The system may embody a graphical user interface that may be used to construct such curves. The system may use linear or nonlinear interpolation methods to interpolate between specified points in the definition of a macro signal. The system may permit macro signals to be specified such that one or more of their defining values may be chosen or altered by a user, by the system, or by other command, such that the macro signal may be generated in a way reflective of the defining values. The system may provide one or more linear sliders, rotational knobs, or other variable interface component, or virtual graphical depictions thereof, which may be used in adjusting the defining values. The system may expose one or more application programming interfaces allowing for the use of various specifications, implementations, and representations of macro signals, parts of macro signals, or mathematical or other operations. The system may embody macro signal specification or tuning modes enabling interactive definition of macro signals or defining values. The system may measure characteristics of input device signals received during specification or tuning to select defining values, such as by recording a sequence of user interactions to establish a macro signal for performing the task performed by the user during the recording. The system may enable specification, loading, tuning, defining, editing, and other configuration functionalities using one or more processing units or by other electronic means, which may be complemented by the system's use of one or more of: algorithms implemented in executable code, one or more graphical displays, one or more graphics specifications or predefined graphical views, one or more memory units, or other means for enabling the functionalities, which the system may embody. The system may use one or more wired or wireless connections to enable these functionalities to be executed remotely. For example, to create a macro signal that may be used to set up a game on a game console output device, the system may prompt a user via one or more graphical displays to manipulate input devices in a way and sequence that, according to the current set of mappings and functions, result in the desired setup in an output device; the system may record the resulting output signals for later use as a macro signal that may be later used with the same mappings and functions to set up a game. The system may begin recording upon detection of a first manipulation by the user (i.e. when one or more signals from one or more input devices take values other than their rest values), and the system may end recording after a preset amount of time lapses following a final manipulation by the user. The system may initiate or terminate recording upon specific action by a user, such as the push of a button or a virtual button. The system may dilate, contract, or normalize recorded sequences in time via signal processing methods or other methods useful in altering signals.

Visualization and Feedback

The system may provide one or more forms of feedback to the user reflecting the state or configuration of the system or interactions of the user with input devices or with the system. The system may provide feedback via one or more of: a visual display, audible, vibrotactile, haptic, or other feedback, which the system may embody, or which the system may connect to remotely via a wired or wireless connection, or via a communications network. The system may, for example, provide feedback to a user reflecting the quality, intensity, or other parameter of the user's interaction with input devices. For example, the system may present an LED, or other light or virtual mark, the color, state, brightness, or other characteristics of which, as the system detects various levels of the parameters, the system may vary according to the detected levels. The system may, for example, provide feedback reflecting the resultant signals after mappings, transformations, or functions may be applied. The system may provide feedback to a user that the user may use while the user grows accustomed to a particular configuration or mapping. For example, the system may display an avatar or other representation of an arm or another body part, or another other figure, the form, color, or other characteristics of which figure the system may alter in response to user interaction with the input devices. The system may provide feedback to a user while the user is using the system to control one or more output devices by interacting with one or more input devices, which may provide the user a more direct response than is decipherable via the response of the output systems.

User Profiles

The system may permit the creation and management of one or more user profiles that may aggregate data or metadata associated with a given user, and may include one or more mappings from input devices to output devices, transformations, functions, or mappings to be applied to signals, identifications of one or more signals to be recorded, stored, or otherwise processed or used, or other data or metadata relevant to the user. The system may permit a user to select a user profile, and may upon selection by a user configure the system according to the specifications of the selected profile. The system may store profiles using one or more memory units. The system may represent the profiles in one or more formats, such as markup documents, JavaScript Object Notation (JSON), EXtensible Markup Language (XML), or other formats that may be used to represent profiles. The system may permit profiles to be created, modified, recombined, and otherwise manipulated via the system, possibly using one or more graphical interfaces which the system may embody. The system may permit profiles to be transferred to or from the system via wireless or wired connection. For example, the system may store as a profile information from one user session that may be used to rapidly configure the system for a future user session.

System Modification and Updates

It may be desirable from time to time to modify or replace existing executable code on the system or to transfer new executable code to the system. Such executable code may fall into several categories, which may include system firmware and software, communication protocol drivers, signal processing functions and other functions for modifying input or intermediate signals, output system start-up macros, input-triggered macros, or other system macros. The system may store such executable code in one or more persistent or non-persistent memory stores, which may consist of program memory or data or other memory. Such memory store may be previously unused or may be previously used by other driver code, system code, macro code, a combination thereof, or any other data. The system may execute instructions directly using one or more processing units, or may load instructions during runtime and execute them as native instructions using one or more processing units, or may load instructions during runtime and interpret them as non-native instructions. The system may permit drivers to be transferred to or from the system using a wired or wireless connection, which transfer may be initiated by a user via a graphical interface, a command line interface, or another user interface, or may be initiated by an automated process.

The system may provide a means for installing drivers that implement lower order communication protocols (e.g., USB), or that implement higher order communication protocols (e.g., MMC/SD) that are based upon lower order communication protocols, which may enable the system to support communications protocols that it may not have supported when manufactured and initially programmed. Drivers may include executable code that may be transferred to the system and executed by such means described in this document. As an example, it may be that an aspect of the system does not natively support communication with an inertial measurement unit (IMU) that sends and receives data using a custom higher-level protocol that is transmitted via the lower-level SPI protocol. If the system has or is supplied with a hardware SPI port capable of maintaining an SPI connection with the IMU, instead of requiring an external adapter to interconvert the signals from and to the IMU so that the system might communicate with it as an input device, a driver may be uploaded to the system to interconvert the signals from and to the IMU. As another example, it may be that an aspect of the system does not natively support communication with a game system that sends and receives data using a custom higher-level protocol that is transmitted via a custom lower-level protocol. If the system has or is supplied with a hardware port capable of maintaining a connection with the game system, instead of requiring an external adapter to interconvert the signals from and to the game system so that the system might communicate with it as an output device, a driver may be uploaded to the system to interconvert the signals from and to the game system.

Extensions for Training, Rehabilitation, and Collaborative Use

Overview

This section describes system functionalities for facilitating training, rehabilitation and collaborative control of systems. Generally speaking (as elaborated further in the following sections), the system may be used to implement various mappings from various input devices to output devices in such a manner as to encourage a user to learn or improve one or more movements or skills of interest. These devices and mappings may be selected and mapped via the system (using features described in this document) for example by a skilled heavy equipment operator, aircraft operator, physical therapist, occupational therapist, caretaker, or other person or entity, so as to assist, encourage, prompt, or otherwise facilitate a patient, trainee, or other user's learning or improving of movements or other modes of input device interaction that may be related to the function of a connected output device being controlled via the system.

The focus may for example be to train a user to skillfully or more skillfully operate an output system, skill being measured by efficacy, efficiency, safety, or any other desired metric or combination of metrics.

For example, consider a new employee learning how to operate a gantry crane. A skilled equipment operator may for example use the system to map redundant control panels to operate the gantry crane, giving the new employee primary control of the crane, and giving herself secondary override operation of the crane. In this way the skilled equipment operator may guide the new employee in operating the gantry crane and may for example better ensure that accidents are prevented during the early phases of training.

The focus may also be to help the user to recover or learn capabilities beyond skillful control of a particular output system (e.g., physical capabilities such as range of motion, strength, speed, or dexterity; mental capabilities such as quickness of response or improved short-term memory retention; other capabilities including but not limited to auditory and visual capabilities).

For physical rehabilitation, this method has been previously employed with specific input devices connected to a specific output device—for example, the ArmeoSpring by Hocoma has an arm exoskeleton connected to a virtual display encouraging a user to perform various therapy-relevant movements—but the method has not been previously employed with an intermediary system that allows one or more input devices to be connected to one or more output systems in multiple configurations as desired (as embodied by the system disclosed in this document), which allows more flexibility in matching rehabilitation or training-relevant types of user interaction to appropriate or engaging output devices. In the course of rehabilitation or training the user may benefit from assistance in either or both of interacting with the input device and controlling the output device. There are a number of methods of assistance (as elaborated further in the following sections) that may extend the rehabilitation method described. These may include using supplemental input devices not intended primarily for rehabilitation or training purposes, supplemental input devices for simultaneous use by other users (the modes of use of which may include complementary, overriding, additive, or some combination thereof), and force-assistive input devices for direct assistance. In the following sections examples are centered mostly around a particular type of rehab exercise (arm range-of-motion training), a single virtual interactive display unit (the Nintendo GameCube game console) and a single application being executed on the virtual interactive display unit (Super Smash Bros.) to illustrate the difference between various assistance modes; however, each mode is not limited to any particular virtual interactive display unit or application executing on such display unit, and can apply to various combinations of rehab exercises or other movements, input devices capturing such movements, output devices, and applications executing on such output devices, provided the input and output devices may be used with the system described in this document.

As a baseline example, consider a stroke patient who is hemiparetic (left-impaired), with limited use of the left arm but proficient use of the right arm. A therapist may for example use the system to map a passive device for range-of-motion exercises (such as the ArmeoSpring arm exoskeleton) with the patient's left arm to the left and right arrow keys of a computer keyboard, and may for example decide to load the game Breakout (a game with a sliding paddle used to keep a ball from falling off of the screen) on a computer. For example, it may be that the therapist sets a threshold such that when the angle of the elbow joint of the exoskeleton is less than 75°, the right arrow key is triggered, and when the angle of the elbow joint of the exoskeleton is more than 105°, the left arrow key is triggered. Using the system, the therapist may also for example replace the ArmeoSpring with another input device relevant to therapy (such as a knee range-of-motion exerciser), which decision may for example be made according to a therapy regimen developed by the therapist, and may also for example replace the game Breakout with another game on another output device supported by the system, which decision may for example be made in order to maintain patient engagement after the patient tires of a particular game.

Patient Supplemental Controls

A desired application to be controlled (such as a video game) running on a connected output device may require more input channels for control than can reasonably be captured via rehabilitation-specific or training-specific movements or other forms of interaction. The system may allow a patient or other user using one or more input devices or channels intended primarily for rehabilitation or other training purposes to also use one or more other input devices or channels not intended primarily for rehabilitation or other training purposes, possibly for the purpose of enhancing the user's ability to utilize the output device being controlled via the system. For example, consider a stroke patient who is hemiparetic (left-impaired), with limited use of the left arm but proficient use of the right arm. A therapist may for example use the system to map a passive device for range-of-motion exercises (such as the ArmeoSpring) with the patient's left arm to the joystick input of a Nintendo GameCube game controller, and may for example decide to load the game Super Smash Bros. (a platform fighting game) on a Nintendo GameCube game console. For example, it may be that the therapist sets a mapping such that angle range of the elbow joint of the exoskeleton from 75° to 105° maps linearly to the full dynamic range of the game controller joystick (from right to left).

With this mapping alone, the patient may be able to move a character in the game but cannot perform other in-game functions such as "attacks" or game console functions such as menu navigation. In order to facilitate a fuller gameplay experience, the therapist may give the patient a supplemental game controller connected via the system to the output device that the patient may use with the right hand. This may for example enable the patient to perform attacks and menu navigation while performing rehab-specific movements to move a player in the game.

Therapist/Trainer/Caretaker Supplemental Controls

A desired application to be controlled (such as a video game) running on a connected output device may require more input channels for control than a patient can manage, for reasons that may include the complexity of their rehabilitation or training setup, insufficient physical ability, other limitations of ability, or some combination thereof. The system may allow a therapist, trainer, caretaker, family member, friend, or other person to use input devices alongside the input devices used by a patient or other user who is using the system for rehabilitation or other training purposes. For example, consider a stroke patient who is hemiparetic (left-impaired), with limited use of both arms. A therapist may for example use the system to map a passive device for range-of-motion exercises (such as the ArmeoSpring) with the patient's left arm to the joystick input of a Nintendo GameCube game controller, and may decide to load the game Super Smash Bros. (a platform fighting game) on a Nintendo GameCube game console. For example, it may be that the therapist sets a mapping such that angle range of the elbow joint of the exoskeleton from 75° to 105° maps linearly to the full dynamic range of the game controller joystick (from right to left). With this mapping alone, the patient may be able to move a character in the game but will be unable to perform other in-game functions such as "attacks" or game console functions such as menu navigation. In order to facilitate a fuller gameplay experience, the therapist may use a supplemental game controller connected via the system to the game console to play the game collaboratively with the patient. This may for example allow the patient to perform more successfully in the game, thus better engaging and motivating the patient.

Therapist/Trainer/Caretaker Override Controls

A desired application to be controlled (such as a video game) running on a connected output device may require more input channels for control than a patient can manage, for reasons that may include the complexity of their rehabilitation or training setup, insufficient physical ability, other limitations of ability, or some combination thereof. The system may allow a therapist, trainer, caretaker, family member, friend, or other person to use input devices alongside the input devices used by a patient or other user who is using the system for rehabilitation or other training purposes.

For example, consider a stroke patient who is hemiparetic (left-impaired), with severely limited use of their left arm but moderate use of their right arm. A therapist may decide to use the system to map a passive device for range-of-motion exercises (such as the ArmeoSpring) for the patient's left arm to the joystick input of a game system controller, and may decide to load the game Super Smash Bros. (a platform fighting game) on a game system. For example, it may be that the therapist sets a mapping such that angle range of the elbow joint of the exoskeleton from 75° to 105° maps linearly to the full dynamic range of the game controller joystick (from right to left). The therapist may also decide to give the patient a supplemental game controller that the patient can use with their right hand, to enable the patient to perform attacks and menu navigation. The therapist may also configure and assign macros to buttons or combinations thereof on the patient's right-hand controller in order to enable more complex attacks than the patient is capable of triggering on their own. Despite these accommodations, the patient may still become frustrated because of their limited ability or limited experience with the game. The therapist may decide to configure a supplemental joystick controller via the system as an override for the patient joystick output. The therapist may then override the patient's joystick control with the therapist's control by moving this supplemental joystick past a specified threshold, and may thus assist the patient in performing more skillfully in the game which may better engage and motivate the patient.

Therapist/Trainer/Caretaker Additive Controls

The system may permit configuration such that input provided by a therapist or other person via one or more input devices or another system, or transformations thereof, may be added to (summed with or logically combined with, as appropriate) that of a patient or other user before, within, or after mapping.

For example, consider a stroke patient who is hemiparetic (left-impaired), with severely limited use of their left arm but moderate use of their right arm. A therapist may decide to use the system to map a passive device for range-of-motion exercises (such as the ArmeoSpring) for the patient's left arm to the joystick input of a game system controller, and may decide to load the game Super Smash Bros. (a platform fighting game) on a game system. For example, it may be that the therapist sets a mapping such that angle range of the elbow joint of the exoskeleton from 75° to 105° maps linearly to the full dynamic range of the game controller joystick (from right to left). The therapist may also decide to give the patient a supplemental game controller that they can use with their right hand, to enable the patient to perform attacks and menu navigation. The therapist may also configure and assign macros to buttons or combinations on the patients right-hand controller in order to enable more complex attacks than the patient is capable of triggering on their own. Despite these accommodations, the patient may still become frustrated because of their limited ability or limited experience with the game. The system may permit the therapist to configure a supplemental joystick controller as an additive supplement to the patient joystick output. The therapist may then adjust the patient's joystick control when desired by moving the supplemental controller from its rest position, and may thus assist the patient in performing more skillfully in the game which may better engage and motivate the patient.

Haptic or Other Input-Derived Assistance

The system may permit signals from one or more first input devices to be mapped and sent to one or more second input devices that support receipt of data. This may facilitate modes of operation wherein a therapist or other first user may guide or otherwise shape the interactions of a patient or other second user. This may also facilitate modes of operation wherein one input devices measuring user characteristics may be used to guide or otherwise shape the interactions of that user. The system may represent or handle such signals as it handles other signals, or may distinguish them from others or handle them differently.

For example, consider a stroke patient who is hemiparetic (left-impaired), with severely limited use of their left arm and moderate use of their right arm. A therapist may decide to use the system to map an active force-assistive rehab device for range-of-motion exercises (such as the Armeo-Power) for the patient's left arm to the joystick input of a game system controller, and may decide to load the game Super Smash Bros. (a platform fighting game) on a game system. For example, it may be that the therapist sets a mapping such that angle range of the elbow joint of the exoskeleton from 75° to 105° maps linearly to the full dynamic range of the game controller joystick (from right to left). The therapist may also decide to give the patient a supplemental game controller that they can use with their right hand, to enable the patient to perform attacks and menu navigation. The therapist may also configure and assign macros to buttons or combinations on the patient's right-hand controller in order to enable more complex attacks than the patient is capable of triggering on their own. Despite these accommodations, the patient may be unable yet to engage in meaningful therapy exercise or gameplay on their own given their limited arm function. The therapist may use the system to configure a supplemental joystick controller (either haptic or passive) as a master controller for the force-assist rehab device, as well as replacing the patient's joystick output with the output of the supplemental joystick controller. In this configuration, the therapist is the one actually controlling the joystick input to the game, while the patient feels the movements used by the therapist in playing the game via the force display of the force-assistive rehab device as controlled by the therapist's joystick. This configuration may be used as an aid for teaching the patient desired movements without hands-on physical assistance when the patient does not have enough function to meaningfully engage in rehab-specific exercises or gameplay unassisted.

Alternately, the therapist may use the system to configure a supplemental joystick controller (either haptic or passive) as a master controller for the force-assist rehab device, while letting the patient's joystick output continue to be the joystick input to the game. In this configuration, the patient is the one actually controlling the joystick input to the game, while feeling the movements used in the therapist's simultaneous gameplay via the force display of the force-assistive rehab device as controlled by the therapist's joystick. This configuration may be used as a way to assist the patient with desired movements without hands-on physical assistance when the patient does not have enough function to skillfully engage in rehab-specific exercises or gameplay unassisted.

As a separate example, consider a stroke patient who is hemiparetic (left-impaired), with severely limited use of their left arm and moderate use of their right arm. A therapist may decide to use the system to map an active force-assistive rehab device for range-of-motion exercises (such as the ArmeoPower) for the patient's left arm to the joystick input of a game system controller, and may decide to load the game Super Smash Bros. (a platform fighting game) on a game system. For example, it may be that the therapist sets a mapping such that angle range of the elbow joint of the exoskeleton from 75° to 105° maps linearly to the full dynamic range of the game controller joystick (from right to left). The therapist may also decide to give the patient a supplemental game controller that they can use with their right hand, to enable the patient to perform attacks and menu navigation. The therapist may also configure and assign macros to buttons or combinations on the patient's right-hand controller in order to enable more complex attacks than the patient is capable of triggering on their own. Despite these accommodations, the patient may be unable yet to engage in meaningful therapy exercise or gameplay on their own given their limited arm function. The system may enable the therapist to use EMG electrodes affixed to the patient to record the patient's bicep, tricep, or other muscle activation, and configure the system to use the EMG input as a an input to the system, which may be sent to the force-assistive rehab device or one or more other input devices or one or more output devices. In this configuration, the effort of the patient to move their arm may be amplified with assistance from the force-assist rehab device based on the intended movement as inferred from processed EMG signals from the patient's arm, which may enable the patient to practice greater range of motion and perform better in the game than they could without assistance.

As a separate example, consider a stroke patient who is hemiparetic (left-impaired), with severely limited use of their left arm and moderate use of their right arm. A therapist may decide to use the system to map an active force-assistive rehab device for range-of-motion exercises (such as the ArmeoPower) for the patient's left arm to the joystick input of a game system controller, and may decide to load the game Super Smash Bros. (a platform fighting game) on a game system. For example, it may be that the therapist sets a mapping such that angle range of the elbow joint of the exoskeleton from 75° to 105° maps linearly to the full dynamic range of the game controller joystick (from right to left). The therapist may also decide to give the patient a supplemental game controller that they can use with their right hand, to enable the patient to perform attacks and menu navigation. The therapist may also configure and assign macros to buttons or combinations on the patient's right-hand controller in order to enable more complex attacks than the patient is capable of triggering on their own. Despite these accommodations, the patient may be unable yet to engage in meaningful therapy exercise or gameplay on their own given their limited arm function. The system may permit the therapist to configure the system to use motion analysis or force sensing of the patient's arm movements to regulate the assistance provided by the force-assist input device. In this configuration, the effort of the patient to move their arm may be amplified with assistance from the force-assist rehab device based on the patient's intended movement as inferred from motion analysis or force sensing, which may enable the patient to practice greater range of motion and perform better in the game than they could without assistance, with less cost and setup burden than that of using EMG electrodes.

Dynamic Adjustment (Progression/Regression) of Mapping/Assistance

The system may permit a therapist or other person or system to adjust defining values affecting mapping, configuration, or transformations via a graphical interface that the system may embody or other means.

For example, consider a stroke patient who is hemiparetic (left-impaired), with limited use of their left arm and moderate use of their right arm. A therapist may decide to use the system to work on patient range-of-motion, mapping a force-assistive rehab device (such as the ArmeoSpring or ArmeoPower) to the joystick input of a game system controller, and may decide to assign games such as Super Smash Bros. (a platform fighting game) on a game system for the patient to play over the course of their rehab treatment. For example, it may be that the therapist sets a mapping such that angle range of the elbow joint of the exoskeleton from 75° to 105° maps linearly to the full dynamic range of the game controller joystick (from right to left). Over the course of treatment, the therapist may manually adjust a scaling parameter (through the router mapping interface) that determines how the working range-of-motion of the patient should map to the dynamic range of the joystick, and may increase the scaling as the patient improves to encourage the patient to increase their working range-of-motion. This adjustment may occur between sessions after an informal or formal patient assessment at the discretion of the therapist. The therapist may also manually adjust the scaling parameter in real-time as the patient plays the game, as desired, for example provide a short period of extra challenge or to accommodate fatigue by decreasing challenge.

Automatic Progression

The system may automatically tune or adjust parameters (such as scalings, thresholds, and other defining values) affecting mappings, configurations, or transformations of signals in response to user effort. The system may set or alter such parameters using open-loop or closed-loop control.

The system may set parameters to achieve goals that may be set by a therapist or other user or system (patient achievement as a function of time, effort, number of repetitions, distance of motion, or other measure of duration) by adjusting parameters to accomplish the goals at their appointed times. The system may set parameter values linearly over time; it may incorporate a cubic spline, quintic spline, or other spline; it may allow for plateaus. For example, consider a stroke patient who is hemiparetic (left-impaired), with limited use of their left arm and moderate use of their right arm. A therapist may decide to use the system to work on patient range-of-motion, mapping a force-assistive rehab device (such as the ArmeoSpring or ArmeoPower) to the joystick input of a game system controller, and may decide to assign games such as Super Smash Bros. (a platform fighting game) on a game system for the patient to play over the course of their rehab treatment. For example, it may be that the therapist sets a mapping such that angle range of the elbow joint of the exoskeleton from 75° to 105° maps linearly to the full dynamic range of the game controller joystick (from right to left). Over the course of treatment, the therapist may set start and end points over a fixed period of time for automated adjustment of a scaling parameter (through the router mapping interface) that determines how the working range-of-motion the patient should map to the dynamic range of the joystick. For example, if the therapist determines that the patient has a comfortable elbow range of motion of 45 degrees, the therapist may decide to set a start point of 45 degrees and an endpoint of 60 degrees over the course of two weeks of therapy. The system may allow the therapist to select from multiple options for how the system should progress the range-of-motion scaling parameter, including but not limited to linear progression, spline-based progression, and piecewise progressions, which may or may not adapt dynamically to the patient to account for plateaus, fatigue, or other factors disruptive to progress or motivation.

The system may set parameters automatically to regulate the values of one or more measures of user effort, for example range-of-motion as percent of full-scale, optionally taking into account present mapping or configuration settings, by treating such measures as setpoints in control schemes or other methods of regulation. The system may permit other sensors, such as heart rate or skin conductance, or processed signals, or other indicators of user stress, impatience, frustration, fatigue, decreased performance, or other characteristics, to be configured to automatically adjust parameters. The system may automatically trigger a plateau period, decrease difficulty for the user, or otherwise adjust configuration upon detecting certain values, sustained values, peak values, value sequences, or other features or measures in signals reflecting the characteristics. For example, the system may adjust one or more parameters using one or more open-loop or closed-loop control schemes (e.g. proportional integral derivative (PID) control, linear quadratic regulator (LQR) control, or other control schemes), using a quantity such as the ratio of (a) a measure of the effort, intensity, quality, or other characteristic of patient interaction to (b) a measure of total possible range given present mapping or configuration (e.g. the range of input that would yield full-scale outputs given current mapping or configuration), or other quantity reflecting patient interaction, as the setpoint of the control schemes. For example, consider a stroke patient who is hemiparetic (left-impaired), with limited use of their left arm and moderate use of their right arm. A therapist may decide to use the system to work on patient range-of-motion, mapping a force-assistive rehab device (such as the ArmeoSpring or ArmeoPower) to the joystick input of a game system controller, and may decide to assign games such as Super Smash Bros. (a platform fighting game) on a game system for the patient to play over the course of their rehab treatment. For example, it may be that the therapist sets a mapping such that angle range of the elbow joint of the exoskeleton from 75° to 105° maps linearly to the full dynamic range of the game controller joystick (from right to left). The system may permit the therapist or other person or system to configure the system for fully automated adjustment of a scaling parameter affecting the mapping of patient working range-of-motion to dynamic range of the joystick. The system may permit the therapist to select from multiple options for how the system should progress the range-of-motion scaling parameter, which may include linear progression, spline-based progression, piecewise progressions, or other progressions, which may or may not adapt dynamically to the patient to account for plateaus, fatigue, or other factors disruptive to progress or motivation.

Extensions for Data Collection, Analysis and Display

Data Capture—"Metadata" (User Info, Length of Session, Equipment) & Usage Data

The system may capture, store, process, transmit, or display metadata about usage or configuration of the system. The metadata may include frequency of use, duration of use, identifications of one or more users or other people or systems configuring the system, identifications of one or more users interacting with input devices, information about input devices connected to the system, information about output devices connected to the system, information about configuration of the system (which may include information about mappings from input devices to output devices), annotations that may be entered or supplied by a user or system, and other information reflecting usage of the system, configuration of the system, or interaction with the system. The system may capture metadata continuously while it is powered, or selectively during certain periods, which the system may permit to be specified by one or more users or other systems, by logging to memory certain internal parameters which may be present as a result of other operation of the system or which may be constructed by the system for the purpose of capturing metadata or for other purposes. The system may capture various portions of metadata on various schedules. The system may store metadata using one or more memory units. The system may process metadata to provide meaningful summaries thereof or for other purposes using one or more processing units or other electronic means. For example, the system may compute averages (mean, median, or mode, as may be useful) of various portions of metadata. The system may also, for example, compute sums of various portions of metadata. The system may also, for example, construct histograms reflecting various portions of metadata that may be captured in discrete-valued form. The system may transmit metadata or data produced by processing metadata via one or more wired or wireless connections. The system may encode metadata or processed data in one or more formats, such as markup documents, JavaScript Object Notation (JSON), EXtensible Markup Language (XML), or other formats that may be used to store, process, display, or transmit data. The system may display metadata or processed data via one or more static or interactive graphical displays the system may embody. For example, consider a therapist using the system to provide a paid service of enabling a user to interact with one or more output devices via one or more input devices; the system may display to the therapist metadata such as duration of use by the user, identification of the therapist, identification of the user, types and identifications of connected input devices, types and identifications of output devices, information about current mappings from input devices to output devices, and other metadata or processed data.

Data Capture Example—Patient Usage Measurements

The system may capture, store, process, transmit, or display data about one or more users' usage of the system or interaction with input devices. The data may include intensity of use, range of motion, one or more forces exerted, speeds of exertion, dexterity, or other characteristics of user interaction, annotations that may be entered or supplied by a user or system, and other information reflecting usage of the system or interaction with input devices. The system may capture data continuously while it is powered, for the duration of one or more user sessions, or selectively during certain periods, which the system may permit to be specified by one or more users or other systems, by logging to memory certain internal parameters which may be present as a result of other operation of the system or which may be constructed by the system for the purpose of capturing data or for other purposes. The system may capture various portions of data on various schedules. The system may store data using one or more memory units. The system may process data to provide meaningful summaries thereof or for other purposes using one or more processing units or other electronic means. For example, the system may compute averages (mean, median, mode, or weighted averages, as may be useful) of various portions of data. The system may also, for example, compute sums of various portions of data. The system may also, for example, apply any transformation, function, or mapping described in this document or other transformations, functions, or mappings to various portions of data. The system may also, for example, construct histograms reflecting various portions of data that may be captured in discrete-valued form. The system may transmit data or data produced by processing data via one or more wired or wireless connections. The system may encode data or processed data in one or more formats, such as markup documents, JavaScript Object Notation (JSON), EXtensible Markup Language (XML), or other formats that may be used to store, process, display, or transmit data. The system may display data or processed data via one or more static or interactive graphical displays the system may embody. For example, consider a therapist using the system to provide a paid service of enabling a user to interact with one or more output devices via one or more input devices; the system may display to the therapist data such as duration of use by the user, intensity of use, range of motion, one or more forces exerted, speeds of exertion, dexterity, or other characteristics of user interaction, annotations that may be entered or supplied by a user or system, and other information reflecting usage of the system or interaction with input devices, and other usage data or processed data. The system may handle usage data and metadata separately or together, and may display, process, or otherwise manipulate, present, or transmit them together or separately.

Data Capture Example—Single or Periodic Patient Assessments

The system may permit single or periodic assessments of the characteristics of a user interacting with one or more input devices connected to the system. The system may instruct or otherwise prompt a user to manipulate or otherwise interact with one or more input devices, and may capture, store, process, transmit, or display signals or one or more parts of signals captured that may reflect one or more of the user's interactions. The system may prompt a user to interact with the input devices in certain ways (i.e. along certain axes, using certain degrees of freedom, etc.) in a particular sequence, and may permit a user or other person or system to specify the sequence, and may execute steps in the sequence for particular durations, which the system may permit a user or other person or system to specify, or automatically upon detection of certain characteristics of a user's interaction with one or more input devices, using one or more processing units, or other electronics means for sequencing, timing, detecting, and capturing signals and prompts. For example, the system may measure user efforts in terms of peaks, averages, median or other functions of any measured data point, which the system may permit one or more users or other persons or systems to select, define, or specify. The recording may be done locally on the mapping device or connected computing device, or remotely on a computing device that is connected by a communication network. For example, a therapist using the system to enable a user to interact with one or more output devices using one or more input devices may wish to measure the development of the user's capabilities over time; the system may permit the therapist to periodically assess characteristics of the user's interactions, which may be used for evaluation of the user's progress, and the system may also process or otherwise manipulate the data and may display the data in graphical, tabular, or other form, or otherwise convey the data to the therapist.

Extensions for Teleoperation/Tele-Administration

The system may permit each system functionality, such as administration of the system, system configuration, mapping, setup, recording, display, reporting, usage summary, dynamic modes, assistive modes, and other system functionalities, via interfaces and functionalities the system may provide or via remote signalling, such as via one or more communications networks. The system may expose one or more application programming interfaces (APIs) that may permit one or more users or other persons or system to interface with the system remotely. For example, the system may enable a therapist to connect to the system via a communication network, and may permit the therapist to collect, view, download, upload, edit, configure, or otherwise interact with data or metadata or configurations, mappings, functions, transforms, or other states, parameters, or aspects of the system.

The following describes a particular aspect of the invention.

Embodiment Overview

Figure 8:
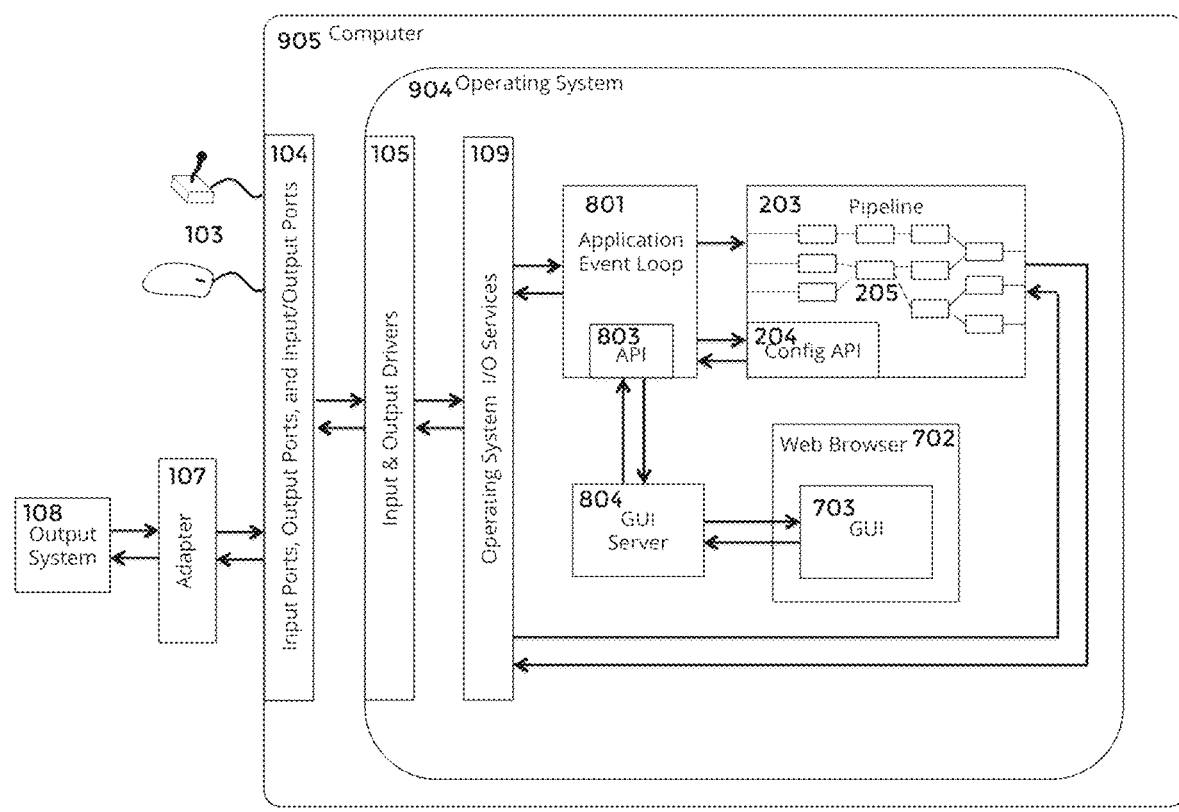
FIG. 8 shows the architecture of an aspect of the system of the present disclosure.

As shown in FIG. 8, an example aspect of a "standalone system" is described here, in which the system receives and interconverts data 104 105 109, feeds it 801 into a signal processing pipeline 203, and interconverts the resulting transformed data 109 105 104 for output to an output system 107 108. The pipeline can be configured using a graphical user interface (GUI) 703, which configures the system using an API 803 provided by the main application 801 described further below.

User Interface Devices and Output Systems Supported by Hardware+Firmware/Drivers In the example aspect, the system includes low-level hardware 104 and software 105 to connect and communicate with user interface devices and output systems. Specific compatibility may be configured to suit particular applications, and standard USB and Bluetooth implementations, as well as other protocols such as switch closure or custom implementations, may be used. The aspect described here has four USB ports and supporting electronics 104 and software 105, allowing the system to support USB HID devices as user interface devices 103 (USB HID devices include mice, keyboards, joysticks, foot pedals, head switches, a variety of assistive devices, and many other specialty devices). If desired, an off-the-shelf USB hub can be used to support more than four devices at once (or devices with large power requirements). The aspect described here has a set of GPIO digital inputs, six of which are connected to physical 3.5 mm jacks to support the use of 3.5 mm switch inputs (such as "buddy buttons" or certain sip-and-puff input devices) as another device type. The aspect described here uses a third-party adapter to support USB bluetooth connectivity; however, in another aspect bluetooth may be built into the system. To support control of a game console 108, the system can be connected to an adapter board 107 that takes serial input over USB and relays it to the game console, either by electronically activating the inputs on the circuit board of a game controller for that console, or by emulating the console controller protocol directly. Alternately, to support control of a PC 108, the system can be connected to an adapter board 107 that takes USB serial input over USB and relays it to the computer as USB HID device. Similarly, it will be understood that in various configurations, various types of input and output devices 103 108 may be supported via hardware and software made part of the system 104 105, or by connecting adapters for those devices to built-in system connectors 104 such as USB ports, such as, for example, cable boxes, home appliances such as microwaves and washing machines, home automation systems such as those using X10, power wheelchairs, and other electronically- or electrically-controlled systems.

OS Services Used to Abstract I/O Layer

The input and output (I/O) layer of hardware and software is abstracted by the system for modularity and ease of interfacing. The system presents an API to provide access to relevant I/O activity with device type and communications protocol abstracted away, such as connection and disconnection of devices, lists of connected devices, parameters of connected devices, data provided by devices, and writing data to devices. In the aspect here described, services of the Linux operating system implement these features 109.

Main Application Uses Asynchronous Event Loop to Respond to Various Events

Figure 9:
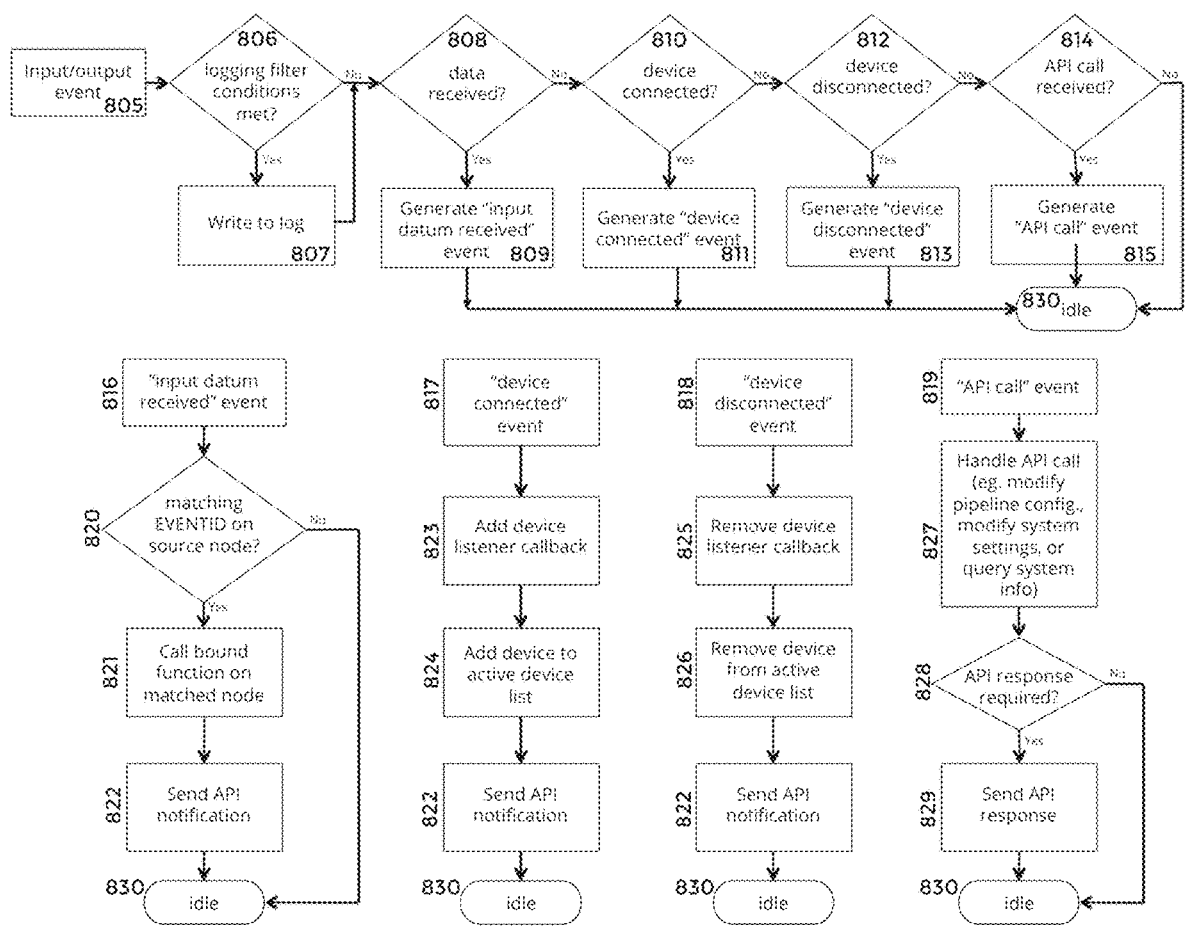
FIG. 9 shows the operation of the main application component of an aspect of the system of the present disclosure.

A main application 801 monitors I/O activity and delegates handling thereof according to its configuration parameters, which may be configured via an API 803 that abstracts configuration parameters into human-understandable concepts. The application utilizes an asynchronous "event loop" 802 as shown in FIG. 9 to efficiently monitor connections and disconnections of devices 817 818, communicate with devices to receive 808 and send 821 data and parameters, relay input data to the pipeline (thus triggering processing and output) 821, handle API requests (for example, requests to configure or re-configure the signal processing pipeline) 819, relay API responses and notifications 822 829, and handle timers. In the aspect here described, the application uses the asynchronous event loop provided by the 'libuv' library of the Linux operating system.

Pipeline Represented as Graph, Nodes, Edges, Flow, Config API, Output

As previously described, the signal-processing pipeline is represented as a network graph 205 whose nodes 301 apply transformations to incoming data as it becomes available, and whose edges 206 carry data from node outputs to node inputs. In the aspect here described, the graph is implemented in an object-oriented programming language (viz. Python) as a Graph object populated with Node objects and Edge objects, as further described below.

The system presents a configuration API to enable the pipeline to be configured for a user's needs, which the system exposes to the user via a GUI. Signal transforms are implemented as Node subclasses, and this capability is exposed to the user via the configuration API. Signal routing is implemented via Edges that connect Node outputs to Node inputs, and this capability is also exposed to the user via the configuration API.

Nodes have input ports and output ports for receiving (reading) and sending (writing) data, and contain executable code that runs when data is available at an input port, typically applying some transformation to the input data and writing the result to one or more output ports. Edges specify connections between an output port of a first Node and an input port of a second Node; i.e., when data is written to the specified output port of the first Node it will be sent to the specified input port of the second Node. Data from user interface devices enters the pipeline 205 via "source" nodes 302, passes through the graph as specified by the edges 206 contained in the pipeline, being transformed by the intermediate nodes 301, and the transformed signals exit the pipeline via "sink" nodes 303 that pass data along to the output system being controlled or to an adaptor to an output system.

System Hardware (Single Board Computer)

In the aspect described, the hardware for the system is a commercial off-the-shelf (COTS) single-board computer 905 (viz. Raspberry Pi 2 Model B) running a Linux operating system (viz. Raspbian) 906. In other computer-based aspects of the standalone system architecture, other computer boards and other operating systems may be used.

Main Application

Device Detection, Device Enumeration, Event Loop and Event Handling

In the aspect described, the system uses OS utilities such as Linux's "evdev" and "udev" for HID device enumeration and interaction. HID devices are uniquely defined by a vendor ID (VID) and product ID (PID), and the system assigns a slot to each device to handle duplicates of the same product—the combination of VID, PID, and slot thus defines a unique ID (DEVID) for a connected HID device. Using OS utilities, the event loop 802 may monitor live HID device connections and disconnections 810 812, and assign a DEVID to each currently connected device. The event loop may use an OS utility to monitor signals from connected HID devices, abstracting the low-level USB HID protocol and exposing each signal datum to the system as an input "event" 808. These events are uniquely identified by an event type (ETYPE) and event code (ECODE), and thus the combination of DEVID, ETYPE and ECODE defines a unique event ID (EVENTID) for each input signal generated by a connected HID device. Each source node stores EVENTIDs for events it handles, and on each input event, the event loop checks to see if there is a source node in the pipeline matching the EVENTID of the input event 820. If so, the event loop injects the input event data into the pipeline via the matching source node 821; otherwise, the input event is ignored.

The system may support input sources other than USB HID devices (such as button-like inputs using 3.5 mm mono jacks, or wheelchair joysticks using DB-9 connectors and custom protocols) by incorporating the hardware, electronics and software to handle communication with the device, and providing a similar unique addressing scheme for that category of devices. The system may also implement device connection/disconnection detection as appropriate for the type of device.

Event Loop Overview

Once the main application is initialized, FIG. 9 illustrates the operation of the event loop 802. On each cycle of the event loop, the application notes whether any relevant I/O event has occurred 805. If one or more data logging rules have been activated, the application checks to see if the rule conditions are met 806, and if so logs data accordingly 807. If new user input data has been received 808, the application creates an "input datum received" 809 event for later handling. If an input or output devices has been connected 810 or disconnected 812, the application creates a "device connected" 811 or "device disconnected" 813 event for later handling. If an API call has been received 814, the application creates an "API call" 815 event for later handling. The I/O monitoring portion of the application then remains idle 830 until these generated events have been processed.

The application then processes generated events. If an "input datum received" event has occurred 816, the application checks to see if there is a source node in the pipeline matching the input event 820. If so, the application injects the input event data into the pipeline via the matching source node 821, and sends an API notification to any registered configuration tool 822; otherwise, the input event is ignored. If a "device connected event" has occurred 817, the application adds a listener callback to handle input events from that device 823, adds the device to a global device monitoring list 824, and sends an API notification to any registered configuration tool 822. If a "device disconnected event" has occurred 818, the application removes its listener callback for that device 825, removes the device to a global device monitoring list 826, and sends an API notification to any registered configuration tool 822. If an "API call" event has occurred, the application takes the appropriate action instructed by the API call 827, and if appropriate 828 sends an API response to any registered configuration tool 829. When all generated events have been processed, this event processing portion of the application remains idle 830 until new I/O events have been handled by the I/O monitoring portion of the application.

API

At runtime, the event loop exposes an API (via a remote communications protocol) for user configuration and monitoring. This supports pipeline editing and real-time view of device statuses and input data via a graphical user interface (GUI), which may run on the host OS, another computer system connected on a local area network (LAN), or on a computer system connected via a wide area network (WAN) such as the Internet. In addition to pipeline editing and monitoring, the API allows for editing of system settings such as logging levels and network configurations. This architecture also enables user interaction with the system API directly via a script or a command line interface if desired, which can be convenient for remote debugging or development of advanced configuration and testing tools.

In this aspect, the TCP protocol is used to establish a connection between the system and a user configuration tool, as well as to send data bidirectionally between the system and the configuration tool. API commands are JSON data objects serialized as newline-delimited strings. When the system receives a string over TCP ending in a newline character, it deserializes the string as a data object and uses a lookup table to execute an appropriate API response based on the data therein. The system similarly replies to API requests or pushes API notifications as JSON data objects serialized as newline-delimited strings.

Pipeline Configuration

The API offers low-level modifications to the graph representation of the pipeline, such as addition, deletion, and querying of executable graph nodes (Nodes) and connections between nodes (Edges), as well as higher-level modifications (such as creating, configuring, or deleting combinations of Nodes and Edges to implement certain desired functionality, for example transforming an analog input signal for output to a digital output channel), and methods for configuring data logging, data transmission, or certain operating parameters of the system (for example, network connectivity settings). The application relays graph modification requests and queries to an API 204 provided by the pipeline 203 that executes the requested modifications or queries and returns messages as appropriate. The program constructs the pipeline at runtime via its API, and may do so from a saved configuration file or from live user editing. Graph modifications are atomic to allow for safe modification of the pipeline at runtime (i.e. while the pipeline is in operation). The pipeline API can support disabling of some or all of the pipeline without modifying the pipeline graph by setting disable flags on certain nodes, for instance to suppress the output of sink nodes during user modification so that the system does not send control signals to an output system during configuration.

Device Profiles, Querying and Configuration

While some devices are capable of providing some self-descriptive information (e.g. via USB HID reports), it may be desirable for the system to have more complete device information than can be obtained by querying a device. To this end, this aspect of the system supports "device profiles" containing "rich" descriptive device information, such as user-friendly names for device inputs (e.g., "Right Trigger" instead of "ABS_RZ"), analog input types (setpoint: low/mid/high/none, spring-return: yes/no, etc.), or analog input ranges (e.g. to allow automatic range scaling for control of a connected output system). These profiles can be packaged with the system, generated by the user through a combination of auto-population and user editing, or shared for instance via the Internet. When a device is plugged in, the system checks to see if it has an associated device profile. If so, it loads device information from that profile; otherwise, it attempts to generate a profile based on the information it can query from the device, and if configured to do so may query the user to provide improved or more complete information.

The system can also support "device category profiles" that match more than one type of HID device. For example, if the pipeline is configured to use input from a particular keyboard (e.g., Logitech K830 Illuminated Keyboard), it might not matter to the user what model of keyboard is used (e.g., a Logitech G710+Mechanical Gaming Keyboard could be an acceptable replacement). In that case it may be inconvenient to have to update the specific keyboard expected by the pipeline if the user switches to another keyboard (or shares their configuration with another user). In this case it might for instance be desirable to assign pipeline input to a device category such as "US QWERTY Keyboard" that matches any keyboard with a standard QWERTY layout, rather than a more specific device identifier like "Logitech K830 Illuminated Keyboard". This aspect of the system such device categories, which can be implemented for instance using a set of standard HID event codes (e.g., codes corresponding to KEY_A, . . . , KEY_Z, KEY1, . . . , KEY0, etc.). In this case, if the system does not have an associated device profile for a newly connected device (or if the system has been configured to check device category profiles before checking device profiles), the system may then check to see if it has an associated device category profile. Any device exposing that set of event codes is a match for the device category.

Pipeline

Graph Objects

As previously described, a signal processing pipeline is represented as a Graph object containing Node and Edge objects. The Graph object manages addition, removal, and querying of Node objects and Edge objects, as well as higher order combinations of these operations for convenience. When an Edge is added, a reference to its target input port is added to the Node object containing the originating output port. This reference is called directly when data is available on that output port. When an Edge is removed, this reference is removed from the Node object containing the originating output port.

Edge Objects

An Edge object defines a connection between an output port on a first Node and an input port on a second Node. When data is available on the specified output port of the first Node of an Edge object, the node will send it to the specified input port of the second Node of that Edge object. It is valid for an output port to be connected via an Edge to an input port on the same Node.

Node Objects

Figure 10:
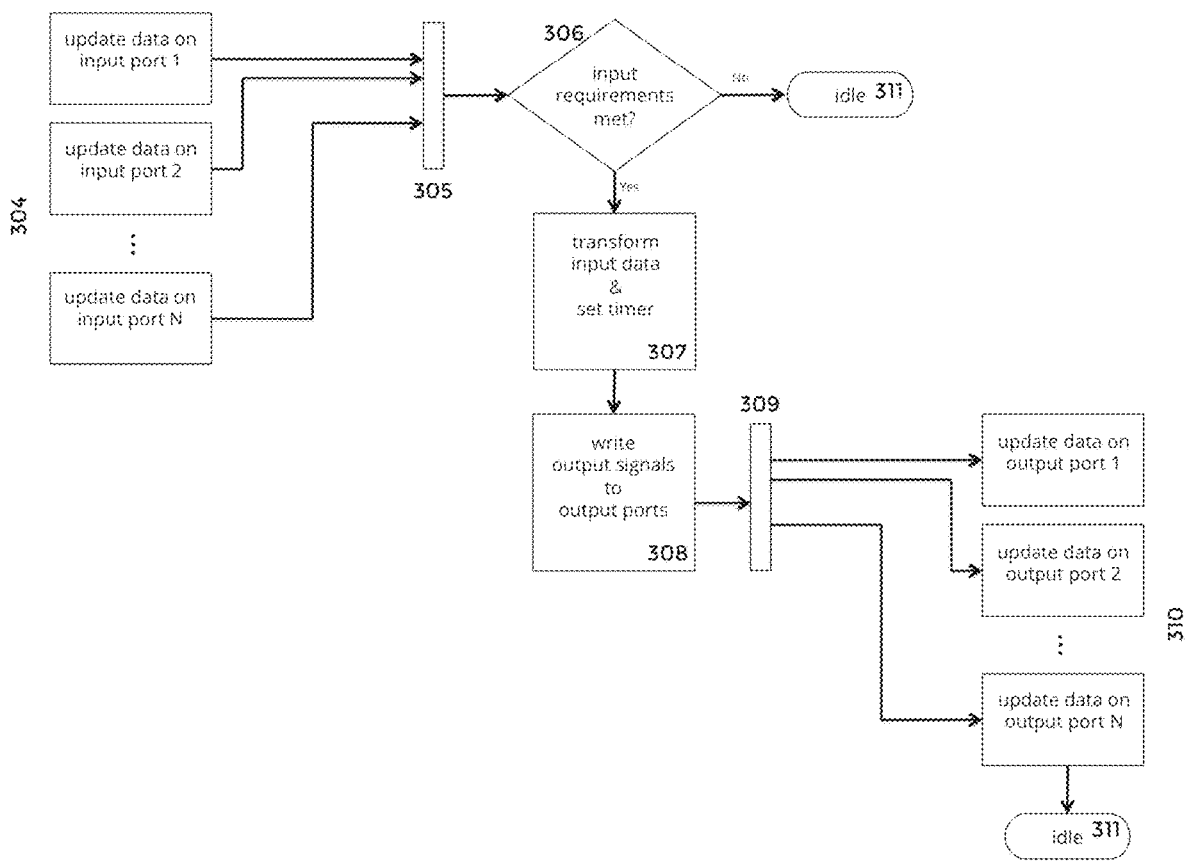
FIG. 10 shows the functionality of a signal processing node according to an aspect of the system of the present disclosure.

As shown in FIG. 10, The base Node class defines a collection of one or more named input ports and output ports 305 309, as well as an execute( ) function that can access data available 306 at the Node's input ports 305, transform the data 307, and write data 308 310 to the Node's output ports 309. The Node maintains flags to indicate whether or not each input port contains unprocessed data. The execute ( ) function is called each time data is written to an input port 304, and can use the input flags to execute differently (or simply wait for more data) depending on which input ports have new data available 306; after the execute( ) function completes, the Node returns to an idle state 311.

The Node may buffer data from input ports for later handling or for time-based signal processing functions. The Node may accept structured data containing named properties and data elements, typically used when the Node expects a set of related values to arrive at the same time. The Node may store additional internal state to enable various signal processing and generation functions. The Node may have an 'enable' flag that can be used to disable Node execution without removing it from a Graph. In addition to acting on data at input ports, Nodes may accept initialization parameters at object creation time that affect their behavior.

Each input port of a port array is accessible within the Node's execute( ) function via the name of the port array and the index of the input port. The execute( ) function also has access to the length of the port array; i.e., the number of inputs connected to the input port.

Figure 11:
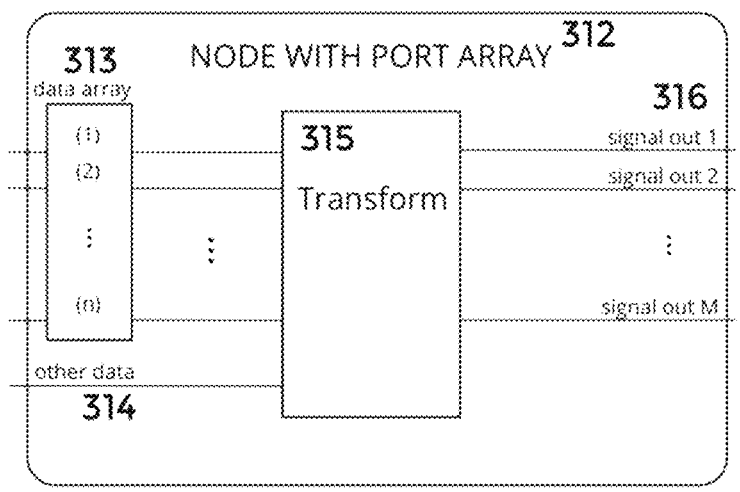
FIG. 11 shows a signal processing node with a "port array" according to an aspect of the system of the present disclosure.

Sometimes it may be desirable for a Node to accept an unbounded number of connections for a particular type of data input, as opposed to being limited to pre-specified named input ports. Therefore, as shown in FIG. 11, Nodes may support 312 named "port arrays" 313 that expand to accommodate multiple connections (i.e. a possibly unbounded list of connections), along with base Node functionality including named input ports 314, an execute( ) function 315, and named output ports 316. For example, as shown in FIG. 12, it may be desirable to create a summing node 323 that applies a sum operator 324 to an arbitrary number of inputs 318, which could naturally be represented as an input port.

Nodes may optionally perform static or dynamic type-checking. In the former case, the node requires incoming connections to certify that they output data of the type specified by the input port; otherwise, the connection is disallowed in the Graph. In the latter case, the type of the incoming data is evaluated at runtime, and a program error is raised if the data does not match the type specified by the input port.

Node Types

Figure 12:
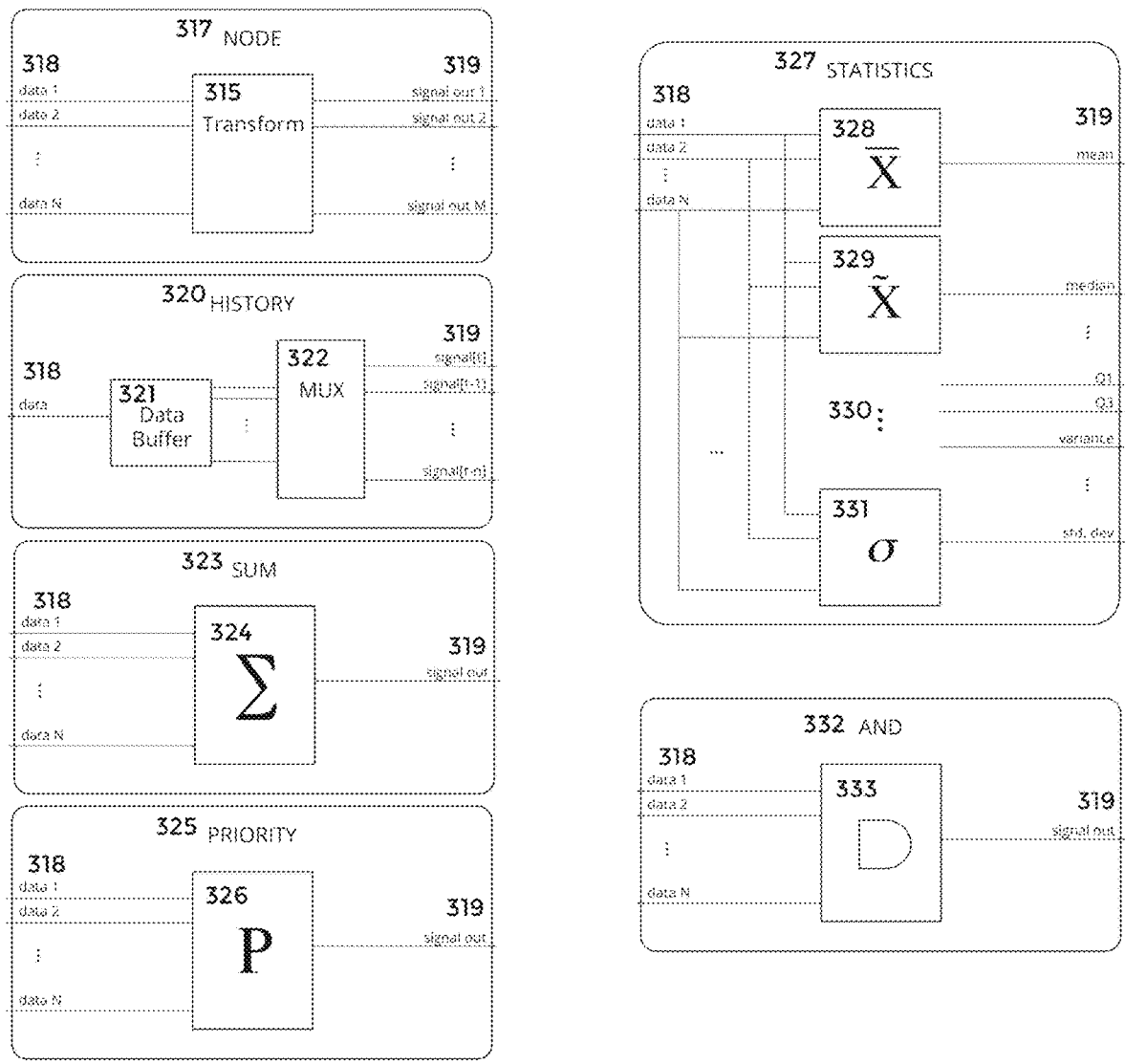
FIG. 12 shows a series of example signal processing nodes according to an aspect of the system of the present disclosure.
Figure 13:
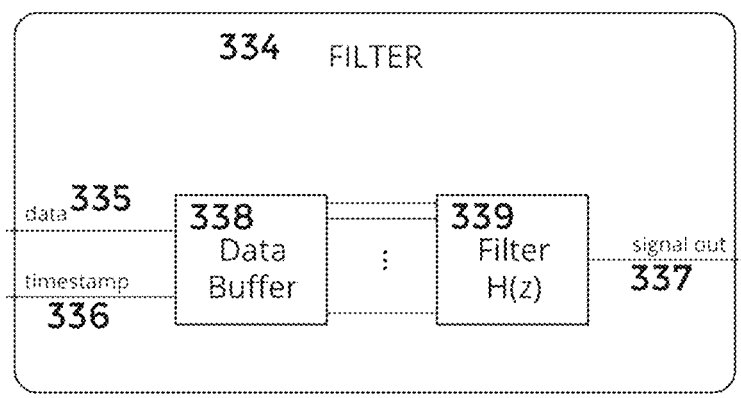
FIG. 13 shows a series of example stateful signal processing nodes according to an aspect of the system of the present disclosure.
Figure 13:
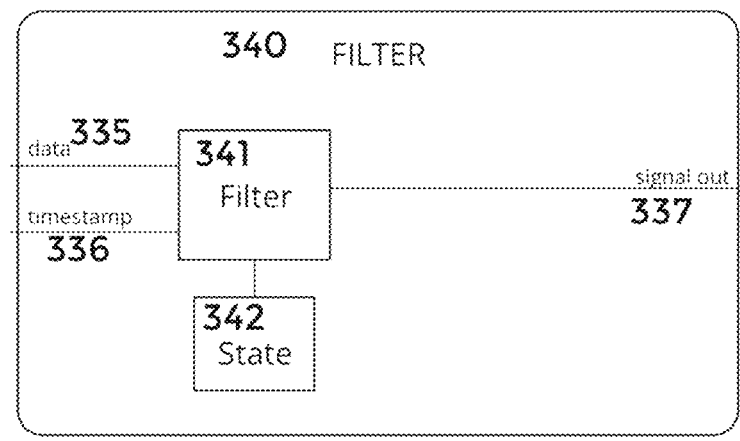
Figure 13:
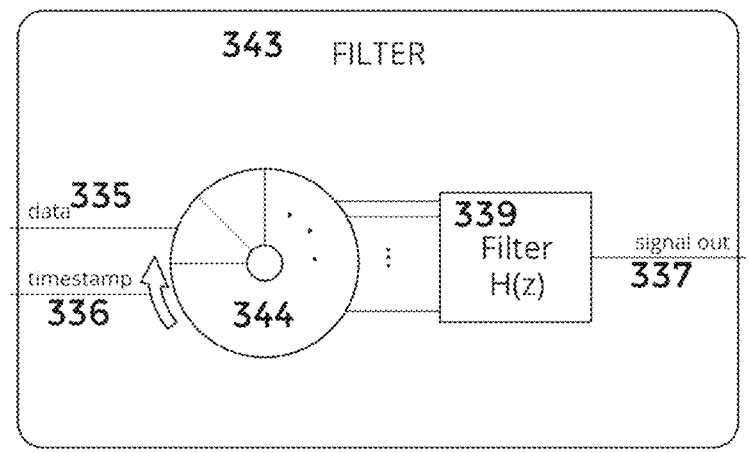

Several types of Nodes may help to implement the various functionality desired in the pipeline, some of which are shown in FIG. 12 and FIG. 13.

1. Transformation nodes 317 are the basic signal processing elements of the pipeline. Transformation nodes perform some signal processing function 315 on their input data 318 and write the processed data to their output ports 319. Examples include a stream combination node that combines output signals from multiple nodes into a single stream, a logical summing node 332 that applies the logical sum operator 333 to inputs on an input port, a signal thresholding node that applies a specified threshold to an input signal, and a statistics node 327 that performs a number of statistical computations on its current inputs 318 such as mode 328, median 329, standard deviation 331, and other statistical measures 330 such as quartiles and variance, outputting each statistic to a different output port 319.

2. For time-dependent pipeline behavior, a Node can be initialized with a timer object from the system event loop, and can also check the OS clock as desired via a system call. The timer can "wake" the node by calling its execute( ) function after a given period of time has from when the timer was previously started within the execute( ) function 307. The OS clock can be used for instance to detect occurrence of "double-taps" from a button-based input stream; if a second tap signal arrives within a specified time following a first tap signal as determined from the system clock, the Node might send output to a "doubletap" output port. The timer object can be used for instance to generate macro sequences; for example, the node might generate a "key repeat" of a given repeat period, if an input port is not deactivated before a given length of time, by repeatedly calling the timer object to wake the node again after that period has elapsed.

3. For time-based processing functions or other functions involving state, a node can maintain state variables and buffer a specified amount of historical signal data, and create output signals using functions that can access and modify state and buffer data. As a simple example, a history node 320 may save input data to a buffer of a given size 321, shifting the buffer contents to accommodate new data discarding old data when the size is exceeded, and output the current history "slice" 322 to an output port of the same size as the buffer. An alternate implementation of a statistics node 327 may apply its statistical computations to buffered data on each input as opposed to applying its statistical computations to the current inputs. An IIR filter node 334 for signal smoothing or gesture detection (e.g. from trackpad input) could be implemented using a data buffer 338 for timestamped 336 signal data 335, applying an IIR filter 339 to the buffered data, and outputting the filtered signal 337. A stateful keypress filter node 340 could be implemented using a state 342 variable to track when a key is in a "down" state and filtering out any further keypress signals until after the key has returned to an "up" state 341.

4. Nodes that retain and process large amounts of signal data may optionally be initialized with data buffers having speed- and/or memory-efficient implementations (not necessarily shared by other transformation nodes, as the buffers may add unnecessary overhead in those cases). The buffer implementation may also offer efficient numerical processing algorithms, such as array operations, matrix multiplication, and convolutions, e.g. using libraries like LAPACK and BLAS. These may be used for instance to implement an IIR filter for signal smoothing, or for gesture detection (e.g. from trackpad input). For example, in the programming language Python, a fast buffer (as compared to normal Python arrays) may be implemented using the Numpy library, which contains a number of efficient numerical processing functions and data structures. In one implementation, the buffer is a circular buffer implemented using a Numpy array of twice the desired buffer length (which we will call "max_length"). As items are added the buffer, an index is incremented until wrapping around at max_length. Each appended item is added in two places in the array: (index % max_length) and ((index % max_length)+max_length), where % is the modulus operator. This way there is always a contiguous stretch of the Numpy array representing the current values in the circular buffer, which can be efficiently sliced for improved speed of operations on the buffer data. The IIR filter 339 previously described may be more efficiently implemented 343 using this efficient ring buffer 344 instead of a default Python array 338.

5. It may be useful to allow one or more signal streams to be overridden by other signal streams; this can be implemented with a particular type of Transformation node we will call a Priority node 325. In one implementation, this Priority node has an input port array named "val", expecting each incoming datum to have a named "priority" attribute, and may have an output port "val". The Priority node stores the last datum of each "val" input, and on each new datum, checks to see if any of the last saved data has a greater priority 326. If so, no new output is written 326; otherwise, the new datum is written 326 to the "val" output port.

6. Source nodes have output ports but no input ports, and generate signals either internally (e.g. using an event loop timer object) or by an external call (for example in response to user input from a user interface device). For instance, an HID Source node may be used by the event loop to inject signals generated by particular HID devices into the pipeline.

7. Sink nodes have input ports but no output ports, and are used to implement "side effects" not affecting other nodes in the Graph, such as sending output signals to a physical output device, or logging signals or pipeline execution.

Given the described node functionality and the capabilities available to someone skilled in the art of using an object-oriented programming language (viz. Python), it is thus straightforward to implement the signal transformations described previously (e.g., affine scaling, thresholding, hysteresis, arbitrary functions, signal limiting, function composition, etc.) within the aspect described, and other signal transformations, by creating Nodes with appropriate execute( ) functions (which may take full advantage of the features of an object-oriented programming language) and by taking advantage of the routing features of the Graph.

Graphical User Interface (GUI)

For convenience and ease of use, a GUI may expose API functions as interactive or noninteractive static or dynamic graphical elements (such as, for example, clickable and draggable elements). A concrete GUI example is described below, but there are many possible GUI implementations capable of interfacing with the system API in the spirit of this invention, any of which may constitute a useful extension of the system.

Figure 15:
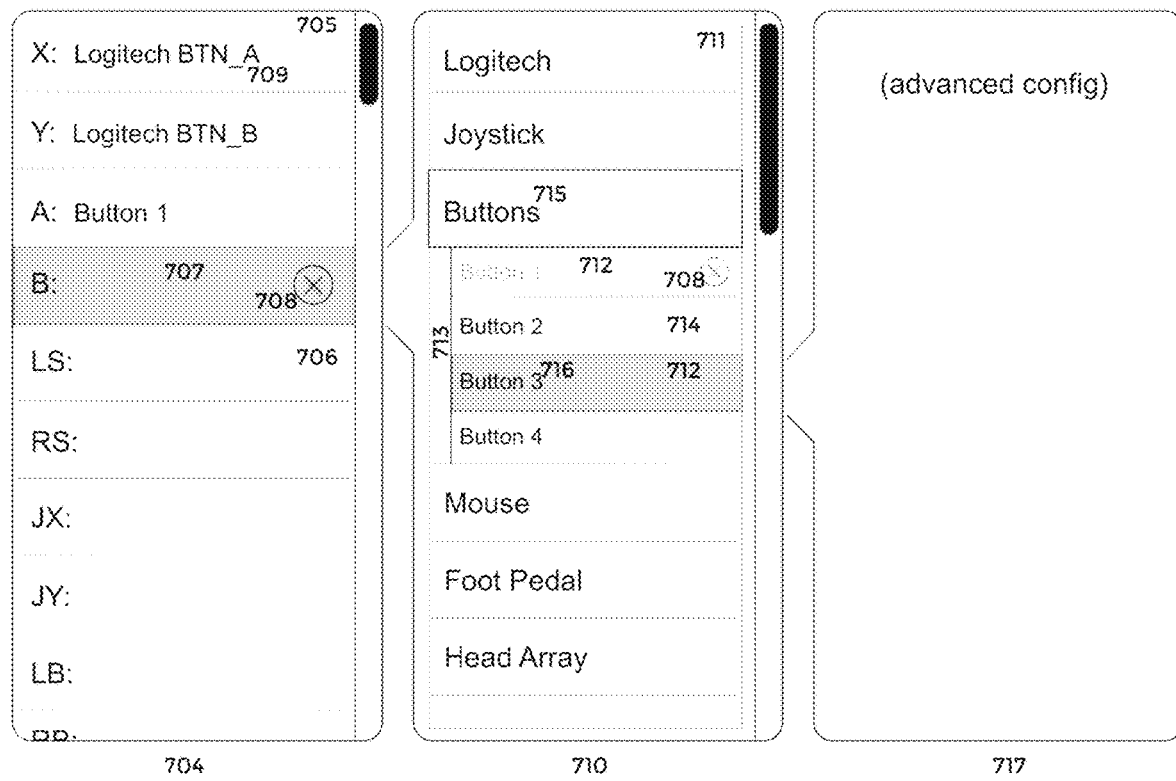
FIG. 15 shows a pane of an example GUI for system configuration according to an aspect of the system of the present disclosure.

For instance, as shown in FIG. 15, the GUI may use the API to retrieve and display 705 available channels 709 for output control. When a user clicks an output to control 707, the GUI uses the API to retrieve and display a dropdown list 711 populated with currently connected input devices. When the user selects a device from this list 715, the GUI uses the API to retrieve and display a list 713 of available input signals that can be generated from that input device. When the user selects an input channel from that list, the GUI uses the API to generate an "input stream" in the pipeline connecting the input channel to the output channel that was first clicked. An "input stream" is an abstraction for a sequence of nodes and edges beginning with a source node and optionally ending with a sink node; this abstraction can make working with the pipeline graph more intuitive for human users. Depending on the selected input channel and output channel, the user may then be presented with various settings for that input stream, such as setting a threshold on an analog signal, adding a deadband to the signal, inverting the signal, using the signal to trigger a specified macro, etc., and the GUI converts the user's selections to API commands that modify the pipeline accordingly. The GUI may also give visual indicators of both raw input signal values and pipeline output, so the user can experiment with inputs to get a feel for how they work and get immediate feedback about the effects of their stream settings. The GUI may also provide options to save, load, delete, and duplicate configurations, so the user can quickly change settings for different use cases or share profiles with other users.

FIG. 15 shows an example GUI implementation, where the system is currently connected to a Logitech wheel, a joystick, a set of four digital input buttons, a mouse, a foot pedal, and a head array as user interface devices, and is connected to an Xbox One game console as an output system. A list of possible output channels for mapping on the Xbox One ("X", "Y", "A", "B", "LS", "RS", "JX", "JY", "LB", etc.) appears on the left side of the GUI 704. Unmapped channels, such as "LS" 706 only show the output channel label. Channels that have a mapping applied, such as "X" which is mapped to the "A" button on the Logitech wheel 705, also display a label indicating the applied mapping 709. Here, the user has clicked the "B" output channel 707, which generates an input stream to control that output channel, and brings up a list of clickable input channels 711 with labels 715 indicating available input devices for mapping ("Logitech, "Joystick", "Buttons", "Mouse", "Foot Pedal", "Head Array") 710. The user has then clicked "Buttons" 715 which brings up a list 713 of the possible input channels 714 for mapping on the "Buttons" device ("Button 1", "Button 2", "Button 3", "Button 4"), and has clicked "Button 3" 716, which maps the "Button 3" input channel on the "Buttons" device to the "B" input for the Xbox One system, and brings up a more detailed settings pane 717 for that mapping. Channels that have already been mapped, such as "Button: Button 1", are greyed out 712. 'X' icons 708 are provided to unmap mapped channels while editing or when hovering over the channels.

Architecture

In the aspect described, as shown in FIG. 8, the GUI 703 is implemented as a "single page web application". A web server 704 runs on the same computer as the main application, and serves an interactive web page on the computer's "localhost" network, which can be accessed on the same computer using a web browser 702 such as Chromium. The web server is responsible for dispatching and receiving API requests and responses 803 to interact with the main application 801. In the aspect described, the API communication takes place over TCP, with API requests and responses sent as JSON data serialized as newline-delimited strings.

In the aspect described, the served web application is implemented with Javascript, HTML, and CSS files, and communicates with the web server using WebSockets. User interactions trigger API requests and corresponding responses, and API responses trigger changes in the UI displayed to the user.

With no changes to the main application API, the GUI may also be implemented in a standalone browser such as that provided by "electron.io", thus combining the three GUI components 702 703 804 into a single application. The GUI may alternatively be implemented as a native Linux application or as a native application on another OS. The GUI may alternatively may be implemented on a different network-connected device such as, for example, an iOS or Android phone.

Example

The following illustrates one non-limiting example of the system of the present disclosure for playing FIFA (a soccer video game) on the Xbox One (XB1) console with various input devices.

Figure 14:
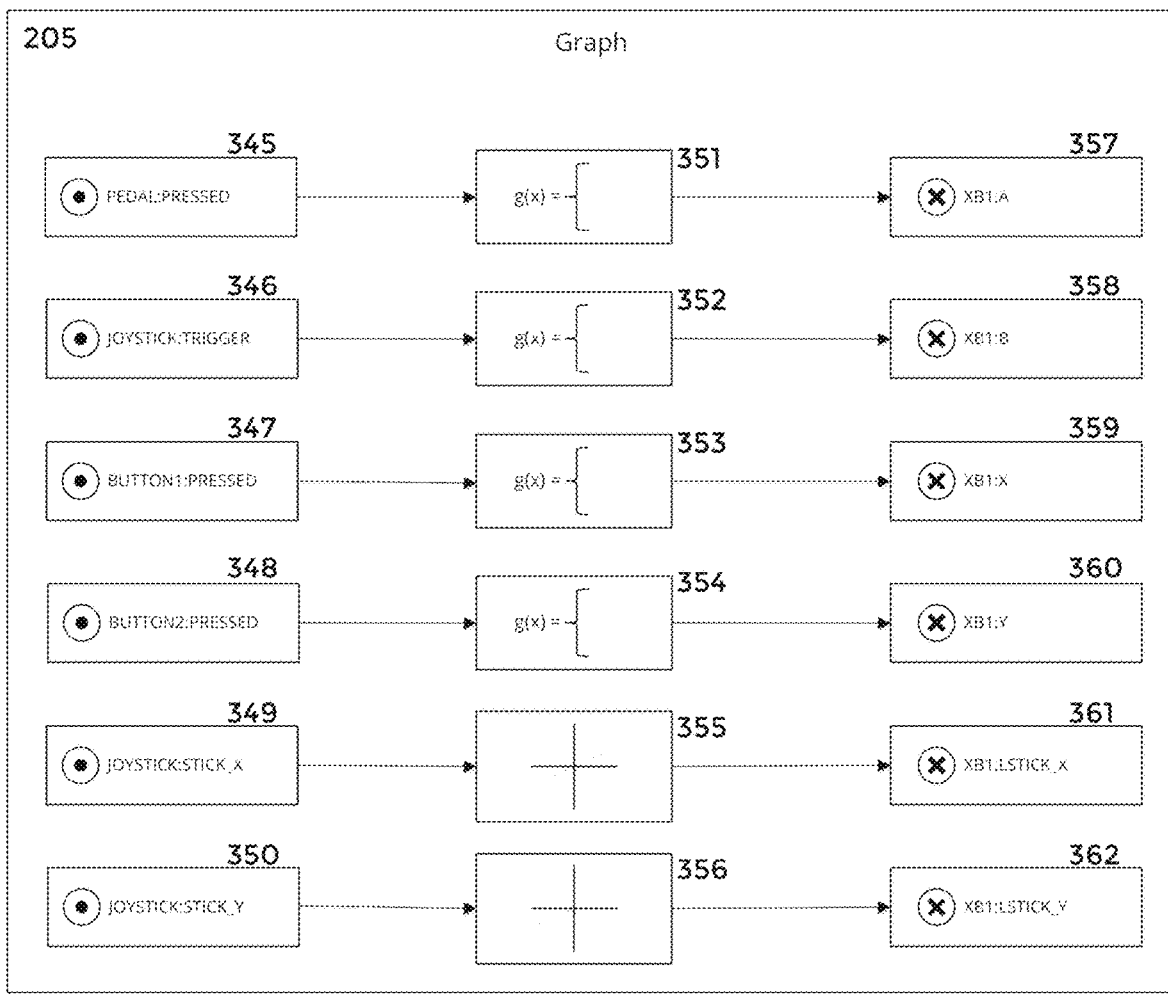
FIG. 14 shows an example system configuration according to an aspect of the system of the present disclosure.

When a user is playing FIFA on the XB1 using a normal XB1 controller without the use of the system described herein, a typical setup may include the following controls mappings:
Overall:
  Move the left thumbstick to control player movement
On Offense:
  Press 'A' to pass
  Press 'B' to shoot
  Press 'Y' to pass a through ball
  Press 'X' to cross or perform a header
On Defense:
  Press 'A' to "contain"
  Press 'B' to tackle or clear
  Press 'X' to slide tackle An example of an alternate gaming setup using the system of the present disclosure is described below, with the mapping shown in FIG. 14.

Suppose the user connects a USB foot pedal ("PEDAL"), two 3.5 mm jack buddy buttons ("BUTTON1", "BUTTON2"), and a USB joystick ("JOYSTICK") to the system, and connects the system to an Xbox One console with FIFA loaded. Assume the pedal has a single digital channel ("PEDAL:PRESSED" 345), each button has a single digital channel ("BUTTON1:PRESSED" 347, "BUTTON2:PRESSED" 348), and the joystick includes, among other things, an analog channel for horizontal stick movement ("JOYSTICK:STICK_X" 349), an analog channel for vertical stick movement ("JOYSTICK:STICK_Y" 350), and a digital channel for a trigger on the joystick ("JOYSTICK:TRIGGER" 346). For the digital input channels, a value of "1" is received by the system when the user activates the respective input, "2" is repeatedly received while the user keeps the input activated, and "0" is received when the user releases the input. The XB1 digital channels (A, B, X, Y etc.) are "pressed" when sent a value of 1 and "unpressed" when sent a value of 0. The joystick analog channel values range from 0 to 1023 (left to right, down to up), and the XB1 left thumbstick channel values range from −32768 to 32767 (left to right, down to up).

Suppose the user wants to press the foot pedal to pass the ball, pull the trigger to shoot, press the first buddy button to slide tackle, press the second buddy button to pass a through ball, and control player movement using the USB joystick. Using a provided graphical interface, the user may "map" 351 352 353 354 355 356 the PEDAL:PRESSED 345 input to the XB1 A button 357, JOYSTICK:TRIGGER 346 to the XB1 B button 358, BUTTON1:PRESSED 347 to the XB1 X button 359, BUTTON2:PRESSED 348 to the XB1 Y button 360, JOYSTICK:STICK_X 349 to the XB1 left thumbstick's X axis 361, and JOYSTICK:STICK_Y 350 to the XB1 left thumbstick's Y axis 362. This may generate a pipeline 205 with the following configuration:

A source node for each digital input (PEDAL:PRESSED, JOYSTICK:TRIGGER, BUTTON1:PRESSED, and BUTTON2:PRESSED) is each connected to a respective processing node 351 352 353 354 that outputs a "0" when receiving a "0", "1" when receiving a 1, and nothing otherwise (i.e. when receiving a 2 or any other input). Each processing node is connected to a respective sink node 357 358 359 360 for each of the output channels XB1:A, XB1:B, XB1:X, and XB1:Y.

Source nodes for the analog inputs JOYSTICK:STICK_X and JOYSTICK:STICK_Y are each connected to a respective processing node 355 356 that linearly scales input values from the range [0, 1023] to the range [−32768, 32767] and outputs the scaled value. The processing nodes are respectively connected to sink nodes 361 362 for the output channels XB1:LSTICK_X and XB1:LSTICK_Y.

The system may identify the specified input devices, interconvert their signals and feed the converted signals into the pipeline, execute pipeline nodes, and interconvert the pipeline output and send these converted signals to the Xbox One.

The invention claimed is:

1. An apparatus for enabling a user to control one or more output systems, where at least one aspect of the one or more output systems is desired to be controlled by a given user action via a given plurality of input devices and is not otherwise configured to be controlled by the user action via the plurality of input devices, the apparatus comprising:
  a. one or more wired or wireless input ports configured to receive input device signals conveying data pertaining to user actions from the plurality of input devices;
  b. a first interconversion logic configured to convert the input device signals to converted input device signals having a data format compatible with a modular, reconfigurable signal processing pipeline;
  c. the modular, reconfigurable signal processing pipeline, configurable via a configuration API to route one or more of the converted input device signals through at least one API-selected first signal transformation to create one or more transformed signals, then route the one or more transformed signals to one or more API-selected aspects of the one or more output systems, thus creating one or more pre-output signals;
  d. a second interconversion logic configured to convert the one or more pre-output signals to one or more output signals having a data format suitable to control the one or more API-selected aspects of the one or more output systems;

e. one or more wired or wireless output ports configured to transmit the one or more output signals to the one or more output systems;

f. the configuration API; and g. a user interface for interacting with the configuration API.

2. The apparatus of claim 1, wherein the configuration API supports retrieving a list of one or more input devices or output systems connected to the apparatus via the one or more input or output ports.

3. The apparatus of claim 1, wherein the configuration API supports receiving notifications when one or more input devices or output systems are connected to or disconnected from the apparatus via the one or more input or output ports.

4. The apparatus of claim 1, wherein the configuration API supports retrieving metadata about one or more input devices or output systems.

5. The apparatus of claim 1, wherein the configuration API supports receiving input signals from one or more input devices or output systems.

6. The apparatus of claim 1, wherein the configuration API supports sending one or more signals into the signal processing pipeline.

7. The apparatus of claim 1, wherein the apparatus is capable of storing a representation of a configuration of the signal processing pipeline in a computer-readable data format, and wherein the apparatus is capable of reading a stored pipeline configuration in the computer-readable data format and configuring the signal processing pipeline to match the stored pipeline configuration.

8. The apparatus of claim 7, wherein stored pipeline configurations are uploaded and downloaded via the internet.

9. The apparatus of claim 7, wherein the configuration API supports reconfiguring a subset of the current pipeline configuration according to a stored pipeline configuration.

10. The apparatus of claim 7, wherein one or more users of the user interface store and load pipeline configurations linked to their user data.

11. The apparatus of claim 7, wherein the apparatus supports reconfiguring a subset of the current pipeline configuration to match a stored pipeline configuration based on the state of one or more signals from one or more of the input devices or output systems.

12. The apparatus of claim 7, wherein the apparatus supports reconfiguring a subset of the current pipeline configuration according to a stored pipeline configuration in response to the connection or disconnection of one or more of the input devices or output systems.

13. The apparatus of claim 1, wherein the signal processing pipeline has a default configuration used when not otherwise configured via the configuration API.

14. The apparatus of claim 13, wherein the default configuration includes a fixed mapping from an input port to an aspect of an output system, regardless of input device connected to the input port.

15. The apparatus of claim 13, wherein the default configuration includes a default first signal transformation to normalize each input device signal according to device metadata.

16. The apparatus of claim 1, wherein the apparatus is part of an output system.

17. The apparatus of claim 1, wherein the apparatus is part of an input device.

18. The apparatus of claim 17, wherein the apparatus is part of a gamepad input device, the gamepad input device comprising a directional pad and a plurality of game buttons.

19. The apparatus of claim 17, wherein the apparatus is part of a kiosk output system, the kiosk comprising a touch-sensitive display.

20. The apparatus of claim 17, wherein the apparatus is part of a physical therapy device.

* * * * *